US011415825B2

(12) United States Patent
Rundle et al.

(10) Patent No.: US 11,415,825 B2
(45) Date of Patent: Aug. 16, 2022

(54) ELECTRONIC DEVICE INCLUDING A DISPLAY ASSEMBLY

(71) Applicant: Apple Inc., Cupertino, CA (US)

(72) Inventors: Nicholas A. Rundle, San Jose, CA (US); David P. Tarkington, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/936,237

(22) Filed: Jul. 22, 2020

(65) Prior Publication Data

US 2020/0379290 A1  Dec. 3, 2020

Related U.S. Application Data

(63) Continuation of application No. 16/552,913, filed on Aug. 27, 2019, now Pat. No. 10,761,356.

(60) Provisional application No. 62/855,715, filed on May 31, 2019.

(51) Int. Cl.
*G02F 1/1345* (2006.01)
*G02F 1/1333* (2006.01)

(52) U.S. Cl.
CPC ...... *G02F 1/133308* (2013.01); *G02F 1/1345* (2013.01); *G02F 1/133314* (2021.01)

(58) Field of Classification Search
CPC .......................... G02F 1/133308; G02F 1/1345
See application file for complete search history.

(56) References Cited

U.S. PATENT DOCUMENTS

| | | | |
|---|---|---|---|
| 5,995,179 A | 11/1999 | Tamura et al. | |
| 9,283,642 B2 ‡ | 3/2016 | Andre | B23K 26/382 |
| 2002/0064036 A1 | 5/2002 | Yano et al. | |
| 2008/0111942 A1 | 5/2008 | Lee et al. | |
| 2011/0164365 A1 | 7/2011 | McClure et al. | |
| 2012/0224117 A1 | 9/2012 | Miyazaki et al. | |
| 2012/0293960 A1 | 11/2012 | Takashima et al. | |

(Continued)

FOREIGN PATENT DOCUMENTS

| | | |
|---|---|---|
| CN | 201130289 Y | 10/2008 |
| CN | 101509618 A | 8/2009 |

(Continued)

OTHER PUBLICATIONS

"KeyMod"—Wikipedia Article, retrieved from "https://en.wikipedia.org/w/index.php?title+KeyMod&oldid=918820014", (4 pp.).‡

*Primary Examiner* — Joseph L Williams
(74) *Attorney, Agent, or Firm* — Dorsey & Whitney LLP

(57) ABSTRACT

An electronic device can include a housing at least partially defining an exterior surface and an internal volume of the electronic device, and an engagement feature affixed to the housing, the engagement feature including a shaft having a first diameter and a top portion having a second, larger diameter. A display component can be disposed in the internal volume and can define a retention feature including a first orifice having a diameter at least as large as the second diameter and a second orifice having a diameter less than the second diameter and at least as large as the first diameter, the first orifice intersecting the second orifice. The shaft can be disposed in the second orifice, and a securing component can be disposed between the display component and the housing.

20 Claims, 18 Drawing Sheets

(56) References Cited

U.S. PATENT DOCUMENTS

2014/0009897 A1     1/2014   Tang
2015/0277179 A1    10/2015   Nishi et al.
2018/0283676 A1    10/2018   Coo
2019/0383996 A1    12/2019   Li

FOREIGN PATENT DOCUMENTS

| | | |
|---|---|---|
| CN | 102736283 A | 10/2012 |
| CN | 104641280 A | 5/2015 |
| CN | 104685410 A | 6/2015 |
| CN | 105302240 A | 2/2016 |
| CN | 205734557 U | 11/2016 |
| CN | 107272238 A | 10/2017 |
| CN | 108181762 A | 6/2018 |
| EP | 2525249 A1 | 11/2012 |
| JP | 2016021061 A | 2/2016 |
| TW | 476908 B | 2/2002 |
| WO | 2014051924 A1 | 4/2014 |

‡ imported from a related application

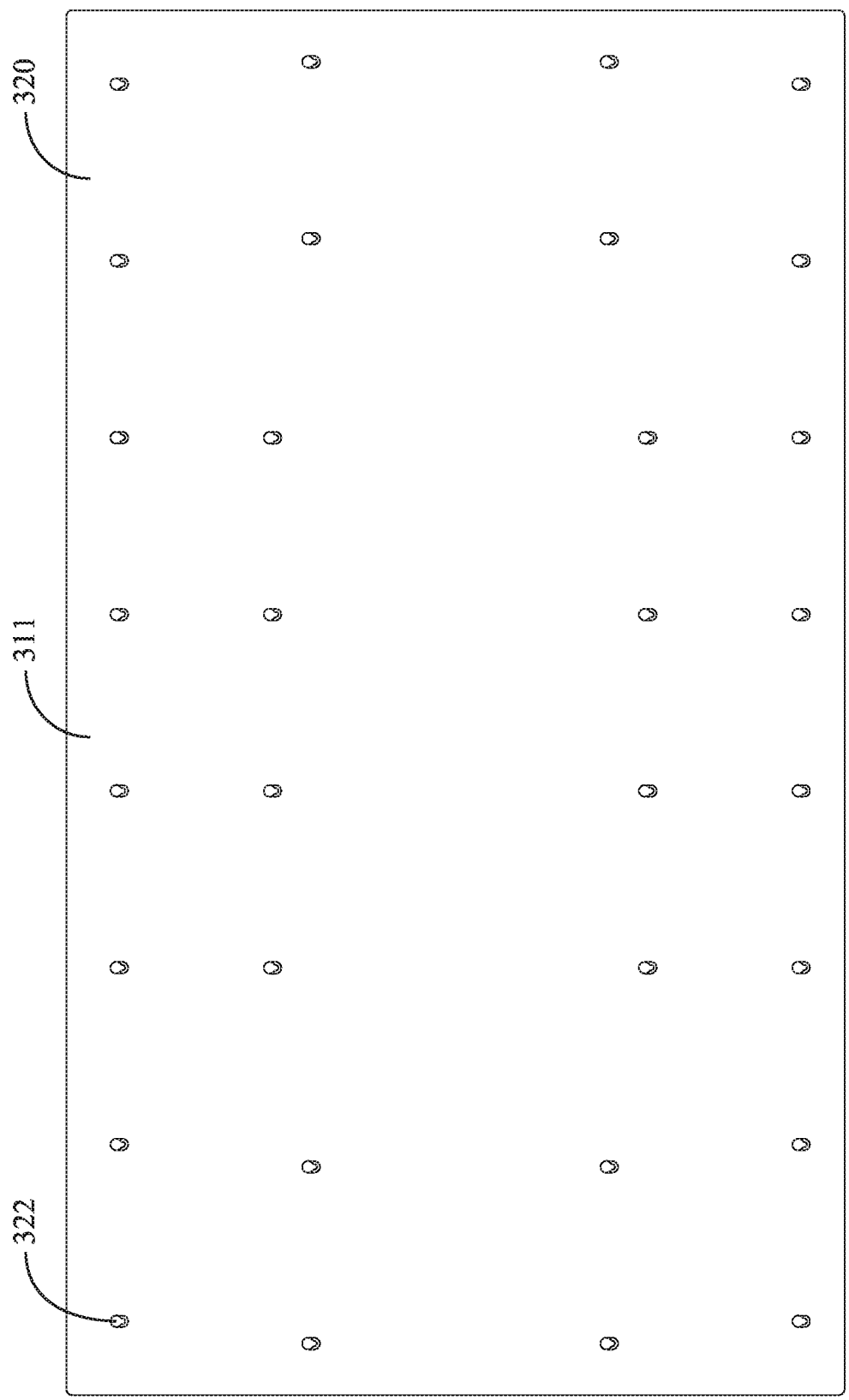

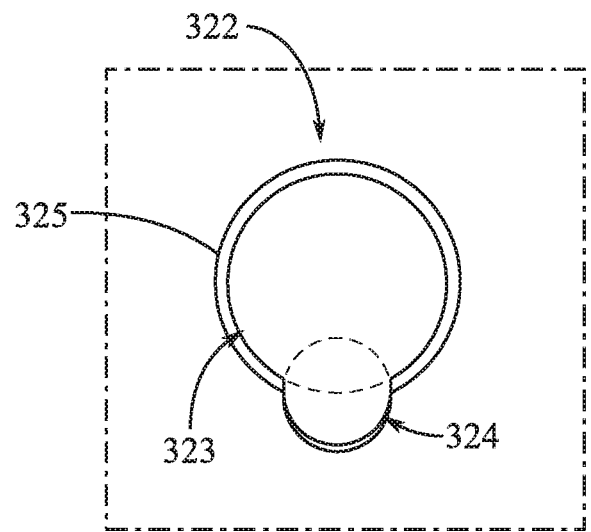
*FIG. 9A*
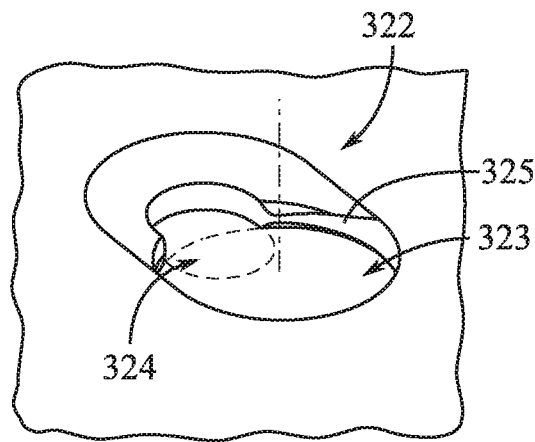
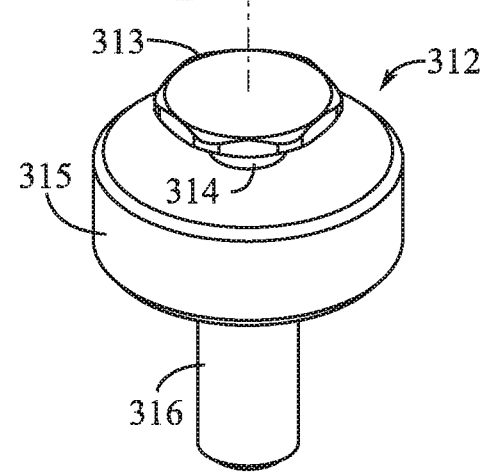
*FIG. 9B*

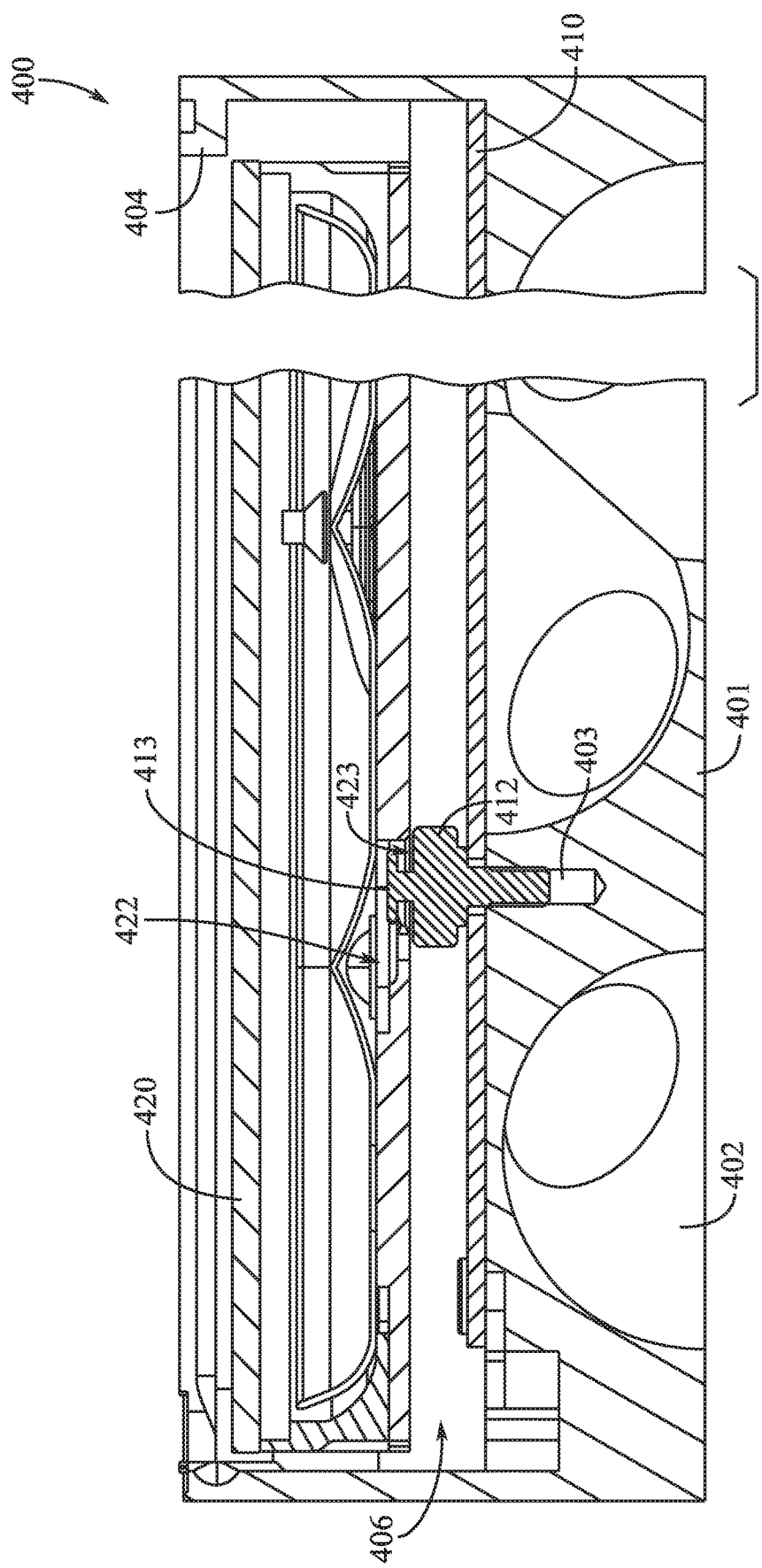

ELECTRONIC DEVICE INCLUDING A DISPLAY ASSEMBLY

CROSS-REFERENCE TO RELATED APPLICATION(S)

This is a continuation of U.S. patent application Ser. No. 16/552,913, filed 27 Aug. 2019, and entitled "ELECTRONIC DEVICE INCLUDING A DISPLAY ASSEMBLY," which claims priority to U.S. Provisional Patent Application No. 62/855,715, filed 31 May 2019, and entitled "DISPLAY ASSEMBLY," the entire disclosures of which are hereby incorporated by reference.

FIELD

The described embodiments relate generally to components for an electronic device. More particularly, the present embodiments relate to components and structures for the assembly of electronics devices.

BACKGROUND

The components of an electronic device, for example, a housing of an electronic device and associated components, can include structures having features tailored to the specific purposes for which they are employed. The components can be configured to provide physical support or protection to other components of the electronic device, provide for thermal transmission, provide for airflow through or around the electronic device, or provide for any number of additional purposes. The components of the electronic device can be designed to provide a unique and pleasing look and feel for a user. Additionally, the components can be designed to optimize one or more dimensions of the device, such as an amount of active area of the device.

Recent advances in electronic devices have enabled high levels of performance. Existing components, structures, and methods of assembly for electronic devices, however, can limit the levels of performance of such devices. For example, traditional housings can limit the performance of an electronic device due to an inability to effectively distribute or reject heat generated by the electronic device to the surrounding environment. Similarly, traditional methods of device assembly can include features or components that inhibit device performance even when non-traditional housing structures are used. Further, traditional structures and methods used to assemble an electronic device can undesirably limit one or more dimensions of the device relative to the individual dimensions of each component. In this regard, further tailoring of components for electronic devices can provide additional or enhanced functionality, desired dimensions, and pleasing aesthetic features.

SUMMARY

According to some aspects of the present disclosure, an electronic device can include a housing at least partially defining an exterior surface and an internal volume of the electronic device, an engagement feature including a shaft and a top portion affixed to the housing, a display component disposed in the internal volume, the display component defining a retention feature including a first orifice having a diameter equal to a diameter of the top portion and a second orifice having a diameter less than the diameter of the top portion and greater than a diameter of the shaft, the first and second orifices intersecting one another, the shaft disposed in the second orifice, and a securing component disposed between the display component and the housing.

In some aspects, the display component can be a backlight unit. The housing can define a threaded receptacle and the shaft can be positioned in the threaded receptacle and can include threads corresponding thereto. The threaded receptacle can have a depth less than a thickness of the housing at a location of the threaded receptacle. The device can include a plurality of engagement features, and the display component can define a plurality of retention features corresponding to the engagement features. The engagement features can extend into the internal volume from a major surface of the housing at least partially defining the internal volume. The securing component can include a shaft extending from the housing and abutting the display component, a shim including a body abutting the housing and a first surface of the shaft, and a flange extending from the body and abutting a second surface of the shaft. The housing can comprise a sidewall and a lip extending from the sidewall, the lip overhanging at least a portion of the display component. The sidewall can comprise a first sidewall and the lip extends a distance from the first sidewall, and the display component can be separated from a second sidewall of the housing at the location of the securing component by the distance. A portion of the housing can define a three-dimensional matrix of apertures extending from a first surface of the portion to a second surface of the portion, and the engagement feature being affixed to the housing at the portion.

According to some aspects of the present disclosure, an electronic device can include a housing at least partially defining an exterior surface and an internal volume of the electronic device. An internal surface of the housing can further define a recess. A component can be disposed in the internal volume, and a display assembly including a cover can at least partially define an exterior surface of the electronic device. A display component can extend perpendicularly from the cover and overlap the recess. A flexible electrical connector extends from the display component in a first direction into the recess, and further extends from the recess in a second direction under the component. In some aspects, the display assembly can be a liquid crystal display. The display component can include one or more daughterboards. The component can be a backlight unit. The first direction can be perpendicular to the second direction. The electronic device can further include a protrusion extending from the housing at a position underlying the component adjacent to the recess, wherein the second direction follows a path over the protrusion and between the housing and the component. The flexible electrical connector can be disposed on the internal surface of the housing defining the recess. The internal surface of the housing defining the recess can be rounded.

According to some aspects of the present disclosure, a method of assembling an electronic device can include inserting a display component into an internal volume at least partially defined by a housing, the housing including a lip extending from a sidewall. The method can include sliding the display component within the internal volume to position a portion of the display component under the lip and to engage a retention feature of the display component with an engagement feature affixed to the housing. The method can further include positioning a securing component in the internal volume between the display component and the housing.

In some aspects, the method can further include passing a portion of a cover assembly into the internal volume between the display component and the housing, adjacent to the securing component. The cover assembly can include a cover at least partially defining an exterior surface of the electronic device, the portion can extend perpendicularly from the cover, and the method can further include fastening the cover assembly to the housing. Passing a portion of the cover assembly into the internal volume can include extending a flexible electrical connector from the portion in a first direction into a recess defined by the housing, and further extending the flexible connector from the recess in a second direction under the display component. Fastening the cover assembly to the housing can include disposing a reworkable adhesive between the cover assembly and the housing. The display component and the cover assembly can be retained in the internal volume, and a major surface of the housing at least partially defining the exterior surface of the electronic device is free of components passing therethrough to fasten the display component or cover assembly to the housing.

BRIEF DESCRIPTION OF THE DRAWINGS

The disclosure will be readily understood by the following detailed description in conjunction with the accompanying drawings, wherein like reference numerals designate like structural elements, and in which:

FIG. 8 shows a rear view of a component of an electronic device.

FIG. 9A shows a close-up view of a portion of the component of FIG. 8.

FIG. 9B shows a perspective view of the portion of the component of FIG. 8 and a second component of the electronic device.

FIG. 10A shows a cross-sectional view of a portion of an assembled electronic device.

DETAILED DESCRIPTION

Figure 1:
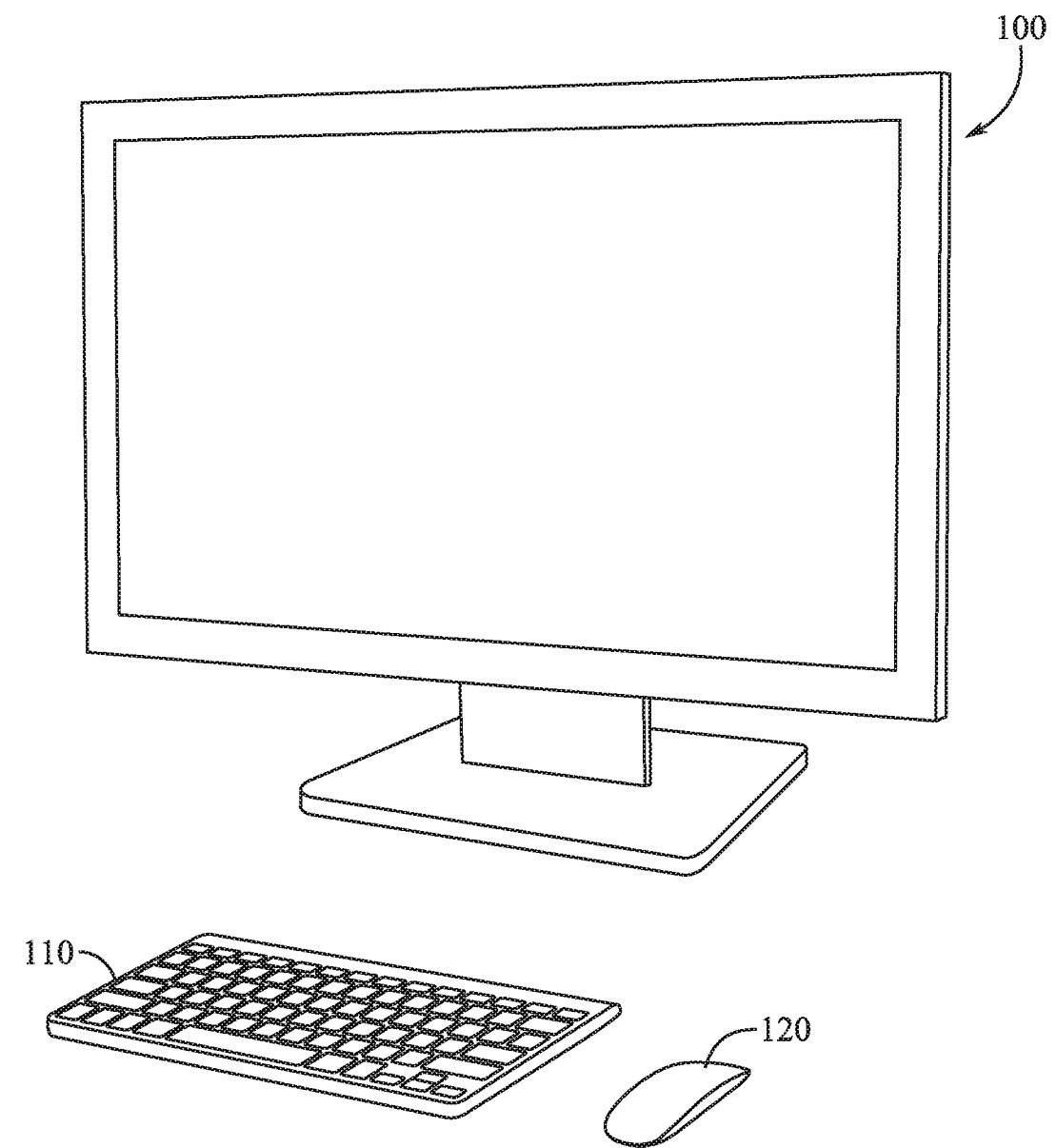
FIG. 1 shows a perspective view of an electronic device.

Representative embodiments are illustrated in the accompanying drawings. The following descriptions are not intended to limit the embodiments to one preferred embodiment. To the contrary, they are intended to cover alternatives, modifications, and equivalents that can be included within the spirit and scope of the described embodiments, as defined by the appended claims.

One aspect of the present disclosure relates to an electronic device including a housing that defines an internal volume and an exterior surface of the electronic device. The electronic device can include display components positioned partially or entirely within the internal volume. The display components can include a backlight unit positioned in the internal volume, and a cover assembly that can include a cover defining an exterior surface of the device and a component, such as a daughterboard, extending perpendicularly from the cover. The cover assembly can also include a display unit. The backlight unit can define one or more retention features that can slidably engage with one or more corresponding engagement features affixed to the housing in the internal volume. An engagement feature can be disposed in a receptacle defined by the housing that does not extend past a thickness of the housing at that location. A securing component, such as a shaft and a shim, can be disposed between the installed backlight unit and the housing to prevent the backlight unit from moving relative to the housing.

The cover assembly can overlay or overlap the backlight unit, and the one or more daughterboards can extend into the internal volume between the backlight unit and the housing, adjacent to the securing component. The housing can define a recess underlying the daughterboard, and a flexible electrical connector can extend from the daughterboard into the recess, around the periphery thereof, and out of the recess along a path through a space between the backlight unit and the housing. A protrusion can be positioned along, and can extend into, the path near an edge of the recess such that the flexible electrical connector passes over the protrusion. The cover defining the exterior surface, which can be a transparent cover such as glass, sapphire, or plastic, can be fastened to the housing along the periphery by a reworkable pressure sensitive adhesive inserted into a thin gap between the edges of the housing and the cover.

Accordingly, various components of an electronic device can be front loaded into and secured to a housing. The components can be retained within an internal volume of the housing without passing retaining hardware through a major surface of the housing, such as the back or rear surface of the housing. In some examples, the housing of an electronic device can include a structure configured to provide a number of desired properties, features, or functionalities. In some examples, passing traditional retention hardware through a major exterior surface of the housing can disrupt or inhibit these desired properties, features, or functionalities. Thus, the components and methods described herein can allow for the assembly of an electronic device including a housing structure without inhibiting the desired properties of the housing structure or undesirably increasing the dimensions of the electronic device. Further, the components and methods described herein can allow for relative ease of assembly and disassembly, for example, to allow for repair or recycling of one or more components of the electronic device.

In some examples, the housing structure or structures can include a body defining both a first surface and a second surface. In some examples, the body can be a unitary body, such as a unitary body formed by a single piece, section, or portion of a material. In some examples, however, the body can be formed from, or can include, two or more portions that can be joined together to form the body, for example, by welding, adhering, or bonding. In some examples, one or more cavities, or portions of cavities, can be formed in separate portions of material, whereupon the portions of material can be joined to form a body including patterns of cavities, as described herein. The first surface and the second surface of the body can be opposing surfaces. At least a portion of the body can define a three-dimensional pattern or matrix of apertures or passageways formed therein. In some embodiments, the three-dimensional pattern can extend through at least a portion or a region of the body, or it can extend substantially throughout the entire body. The three-dimensional pattern can extend across one or more of an entire height, width, and/or depth of the body. The three-dimensional pattern or matrix can be formed or defined by a combination of one or more cavities extending into the body from the first surface, and one or more cavities extending into the body from the second surface of the body.

In some embodiments, the one or more cavities extending into the body from the first surface can intersect with one or more of the cavities extending into the body from the second surface to form the three-dimensional pattern or matrix. That is, in some examples, the negative space of a cavity extending into the body from the first surface of the body can intersect or interfere with the negative space of one or more cavities extending into the body from the second surface of the body. Further, in some embodiments, the cavities can eccentrically intersect, merge, or interfere to form an aperture. The aperture or apertures can be through-holes in the body, that is, as used herein, the term aperture can refer to a hole in a body that passes entirely through the body. In some embodiments, the three-dimensional pattern of apertures as described herein can have a surface area that is up to twice as large, up to five times as large, up to ten times as large, or even several orders of magnitude larger than the surface area of a similarly sized and shaped body that does not include the three-dimensional pattern of apertures. This high amount of surface area can serve to greatly increase the ability of the body to transport heat away from itself or away from other components of an electronic device in contact with the body, for example, by direct convection to the surrounding air. In some embodiments, the cavities extending into the body from a surface of the body can be arranged in a pattern. This pattern can be a regular or repeating pattern of cavities that extends throughout a portion of a surface, or in some examples, substantially an entire surface of the body.

The structures described herein, such as housing structures for electronic devices, can provide for enhanced heat removal relative to traditional housing structures. For example, a structure as described herein acting as a housing for an electronic device can remove relatively large amounts of heat from the electronic device via passive heat transfer to air surrounding the structure by maximizing surface area and providing apertures or passageways that allow air to be driven into or through the device, for example by a fan, to remove even more heat from the electronic device. These enhanced levels of heat removal, as described above, can result in significant performance gains for the electronic device and can allow for the use of components or operating levels that heretofore have not been achievable with traditional housing structures.

The structures described herein can also enhance characteristics of other aspects of the electronic devices with which they are associated. For example, when used as a housing or other structural component of an electronic device, a structure as described herein can provide a high level of strength and stiffness to weight ratio to the device. Traditional structures often achieve enhanced stiffness or strength by thickening or enlarging certain portions of the structure, often resulting in an increase in the weight and size of the electronic device, which are not typically desirable to a user. The structures described herein can include, for example, a matrix of passageways that serves to greatly enhance the stiffness of the three-dimensional structure, without significantly increasing the size or weight of the structure. Thus, a relatively lightweight, yet extremely strong and stiff electronic device can be produced.

The light weight and stiffness of the structure can also provide a user with a pleasing experience when handling the device. While light weight, the structure is sufficiently rigid and tough to allow the electronic device to be used over a long period of time while maintaining dimensional stability. Additionally, the present structure allows for custom designs to be 3D printed or manufactured that optimize a number of factors including weight, rigidity, heat transfer considerations, and manufacturability. In some examples, a structure as described herein can include a relatively intricate repeating pattern that, in addition to enhancing heat removal capabilities and providing stiffness, provides a visually interesting or aesthetically pleasing effect to the user. Such a structure, for example, when used as a housing, can also include a variety of colors on one or more regions of the housing to enhance the visual appearance and provide a pleasing aesthetic experience to the user.

Further, in some embodiments, the structures described herein can act as shielding for the electronic device, while still allowing for air flow therethrough. For example, a structure can act as an electromagnetic interference (EMI) and/or electromagnetic compatibility (EMC) noise shield for one or more components housed therein. In some embodiments, such as where the structure includes a metal and/or conductive material, the structure can provide EMI and/or EMC shielding for one or more electronic components of the device, such as integrated circuits. Thus, in some examples, additional shielding material and/or measures can be eliminated while achieving a desired level of EMI and/or EMC shielding because of the housing structure. This beneficial shielding effect can thus reduce the cost and weight of a device, while providing other enhanced characteristics, as discussed herein.

While the housing structures described herein, for example, including a matrix of passageways, can provide enhanced performance and other benefits to an electronic device, traditional hardware and methods for retaining device components typically engage solid housing panels, or otherwise pass-through or disrupt the structure, thereby reducing or inhibiting the benefits provided. The present systems retain the components of an electronic device within an internal volume at least partially defined by a housing including a structure as described herein without passing hardware or retention components through a major surface of the housing. Such a construction allows the structures of the housing, such as a matrix of cavities or passageways, to be relatively uninterrupted by features used to retain components in the structure, thereby maximizing the benefits provided by the structures.

The present system allows for very narrow bezels or borders to be formed on display devices, such as liquid crystal display (LCD) devices. These narrow borders do not traditionally provide sufficient material for hardware to engage and retain the components of the device, such as the backlight or cover assembly without the insertion of screws through the rear major surface of the housing or through a sidewall of the housing. The present mounting system facilitates front mounting and secure retention of the display components, while maintaining very narrow bezels and borders, without passing fasteners through the rear or side surfaces of the housing.

The present mounting system enables the components of an electronic device, such as display components, circuit boards, fans, and other electronic components, to be disposed adjacent or in close proximity to a major surface of a housing having a structure as described herein. This arrangement of components can aid in maximizing the thermal benefits provided by the housing structure.

Unlike traditional methods of retaining components in an electronic device without passing hardware through major surfaces of the housing, such as gluing components directly to the housing, the present mounting system allows for disassembly of the device without destroying the housing and/or components. Accordingly, electronic devices assembled with the present mounting system allows for devices to be disassembled, for example, to repair or replace individual components or to recycle or reuse individual components.

In some examples, the design of the components described herein can allow not only for retention in a housing having a structure as described herein, but can also aid in minimizing one or more desired dimensions of the device. For example, it can be desirable to provide an electronic device having a reduced thickness. Traditional mounting and retention hardware can necessitate an arrangement of components that includes unoccupied space in the internal volume, thereby increasing the thickness of the device. The components and methods described herein, however, can allow for a component, such as a backlight unit, to be retained in the internal volume adjacent to a rear major surface thereof, providing for a reduced overall device thickness or a larger available area in the internal volume for additional components. Further, by retaining a component, for example, with retention features defined by the component and engagement features affixed to an internal surface of the housing, there is reduced need for housing material around the periphery to retain the component. This construction can allow for construction of display devices including relatively narrow bezels or borders around the active area of the display.

These and other embodiments are discussed below with reference to FIGS. 1-14. However, those skilled in the art will readily appreciate that the detailed description given herein with respect to these figures is for explanatory purposes only and should not be construed as limiting.

FIG. 1 shows an example electronic device 100 that can include a structural housing and front mounted components, as detailed herein. The electronic device 100 shown in FIG. 1 is a display or monitor, for example, as can be used with a computer. This is, however, merely one representative example of a device that can be used in conjunction with the ideas disclosed herein. The electronic device 100 can, for example, correspond to a portable media player, a media storage device, a portable digital assistant ("PDA"), a tablet computer, a computer, a mobile communication device, a GPS unit, a remote-control device, or other electronic devices. The electronic device 100 can be referred to as an electronic device, a device, or a consumer device. As shown, the electronic device 100 can include any number of input devices such as a keyboard 110, a mouse 120, a track pad, a stylus, a microphone, or any combination of input devices. Further details of the electronic device 100 are provided below with reference to FIGS. 2A-2B.

Figure 2A:
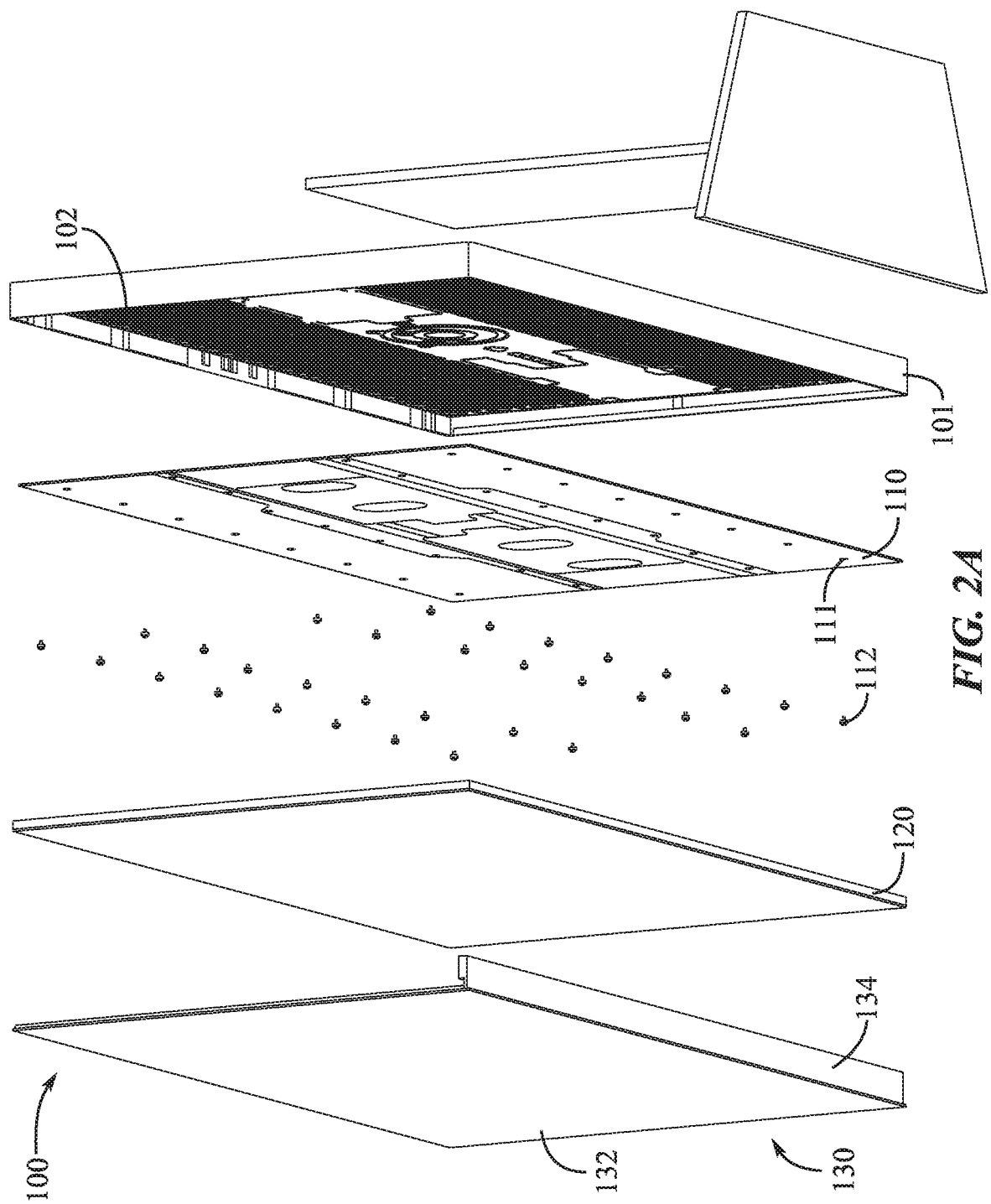
FIG. 2A shows an exploded view of the electronic device of FIG. 1.

Referring now to FIG. 2A, the electronic device 100 can include a housing 101 at least partially defining an exterior surface and an internal volume of the device. In some examples, the housing can include a portion or region that can include a body defining a first surface and a second surface. At least a portion of the body can include a three-dimensional pattern or matrix of apertures or passageways as described herein. The electronic device 100 can further include a backplate 110 that can be disposed adjacent to a major surface of the housing 101 at least partially defining the internal volume. In some examples, such as where the housing 101 includes a matrix of passageways, the backplate 110 can serve to seal the internal volume from an exterior or ambient environment that might otherwise be accessible through the passageways. In some examples, this seal can be substantially watertight or airtight and can prevent or significantly inhibit the passage of dust or other particulate matter from the ambient environment into the internal cavity of the device 100.

In some examples, the backplate 110 can also assist in conducting heat generated by components of the device 100 to the housing 101 where the housing structure can further aid in removing the heat from the device 100, for example, via convection. Thus, the backplate 110 can include a relatively thermally conductive material, such as a metal, for example, alloys of steel, aluminum, copper, and other metals. In some other examples, however, the backplate 110 can include metal, ceramic, polymer, or combinations thereof. The backplate 110 can define one or more apertures 111 that can be sized to receive a portion of an engagement feature 112, for example, a post of an engagement feature 112 as described herein. In some examples, the engagement feature or features 112 can secure the backplate 110 to the housing 101 and can further seal the backplate 110 and the housing 101 at the location of the apertures 111. Although referred to separately as a housing 101 and a backplate 110, in some examples, the housing 101 and the backplate 110 are referred to together as a housing.

The electronic device 100 can further include a display component 120, for example, a backlight unit 120. Although illustrated as a backlight unit, the display component 120 can include substantially any desired display or device component. In some examples, the backlight unit 120 can include internal components, such as one or more light emitting diodes (LEDs), cavity reflectors associated with the LEDs, internal posts that can define a thickness of the backlight unit, printed circuit boards, and a baseplate, as will be described further herein. A portion of the backlight unit 120, such as a rear major surface thereof, can define one or more retention features (not shown) that correspond to and can slidably engage with the engagement features 112 protruding from the backplate 110, as will be described herein.

The backlight unit 120 can be relatively heavy compared to other components of the device 100, so multiple engagement features 112 can be affixed to, and protrude from, the housing 101 to engage the retention features of the backlight unit 120 and evenly support its weight over a large area of the housing 101. Further, the design of the housing 101, backplate 110, and the engagement features 112 can allow for intimate thermal contact between the backlight unit 120 and the backplate 110, thereby providing for increased thermal conduction and improved device cooling. During assembly, the backlight unit 120 can be lowered or inserted into the internal volume so that the engagement features 112 can pass into the retention features, whereupon the backlight unit 120 can be laterally translated to complete engagement of the engagement features 112 with the retention features to secure the backlight unit 120, as will be described in further detail below. As the backlight unit 120 can be securely connected to the housing 101 via the engagement features 112, the number of additional features or securing components disposed around a periphery of the backlight unit 120 can be reduced, thereby allowing the backlight unit 120 to extend substantially an entire height and/or width of the internal volume, and providing a desired level of lighting to any display unit positioned thereover.

The electronic device 100 can also include a cover assembly 130. The cover assembly 130 can include a cover 132, which can at least partially define an exterior surface of the device 100. The cover can be any desired transparent material, for example, glass, plastic, sapphire, or other transparent materials. In some examples, a display unit can be adhered to the cover 132, for example, to a surface of the cover 132 opposite the surface defining an exterior surface of the device 100. In some examples, the display unit can be an LCD unit, although in other examples any form of display unit can be used as desired, such as an LED display unit, OLED display unit, plasma display unit, quantum dot display unit, and other display units. The display unit can be affixed to the cover by gluing, adhering, or any other desired securing technique. Further, in some examples, the cover 132 can cover additional components such as a camera, or a touch sensitive surface such as a touchscreen.

The cover assembly 130 can further include a display component 134 extending from the cover 132. In some examples, the display component 134 can include one or more electronic components, such as printed circuit boards including processors, memory, and other electrical components, and can be referred to as daughterboards. The daughterboards 134 can be electrically connected to the display unit, for example, by a flexible electrical connector, and can drive or control the display unit. The daughterboards 134 can extend substantially perpendicularly from the cover 132, and can be mounted or affixed to the cover 132. In some examples, a bracket can be glued or otherwise affixed to the same side of the cover 132 as the display unit to maintain the daughterboards 134 in a position perpendicular to the cover 132. In some examples, the bracket can include metal, such as stainless steel. Additional electrical connectors (not shown), such as flexible electrical connectors, can extend from the daughterboards 134, as will be described herein.

In an assembled state, the daughterboards 134 can be disposed in the internal volume in a space between the backlight unit 120 and a sidewall of the housing 101. The cover 132 can be fastened to the housing 101, for example, along a periphery thereof by a reworkable adhesive that can be provided through a gap between the exterior surface of the housing 101 and the cover 132, as described further herein. Any number of additional internal components can be disposed between the housing 101 and the cover assembly 130. The housing 101 can define at least a portion of an exterior surface of the device 100. The cover 132 can define a front exterior surface of the device 100. Together, the housing 101 and the cover 132 can substantially define the exterior surface and/or the internal volume of the device 100.

The device 100 can also include internal components such as processors, memory, circuit boards, batteries, fans, sensors, and other electronic components. Such components can be disposed within the internal volume defined at least partially by the housing 101 and the cover 132, and can be affixed to the housing 101 via internal surfaces, attachment features, threaded connectors, studs, or posts that are formed into, defined by, or otherwise part of the housing 101 and/or the cover assembly 130. Additional features of the housing 101 are provided below with reference to FIG. 2B.

Figure 2B:
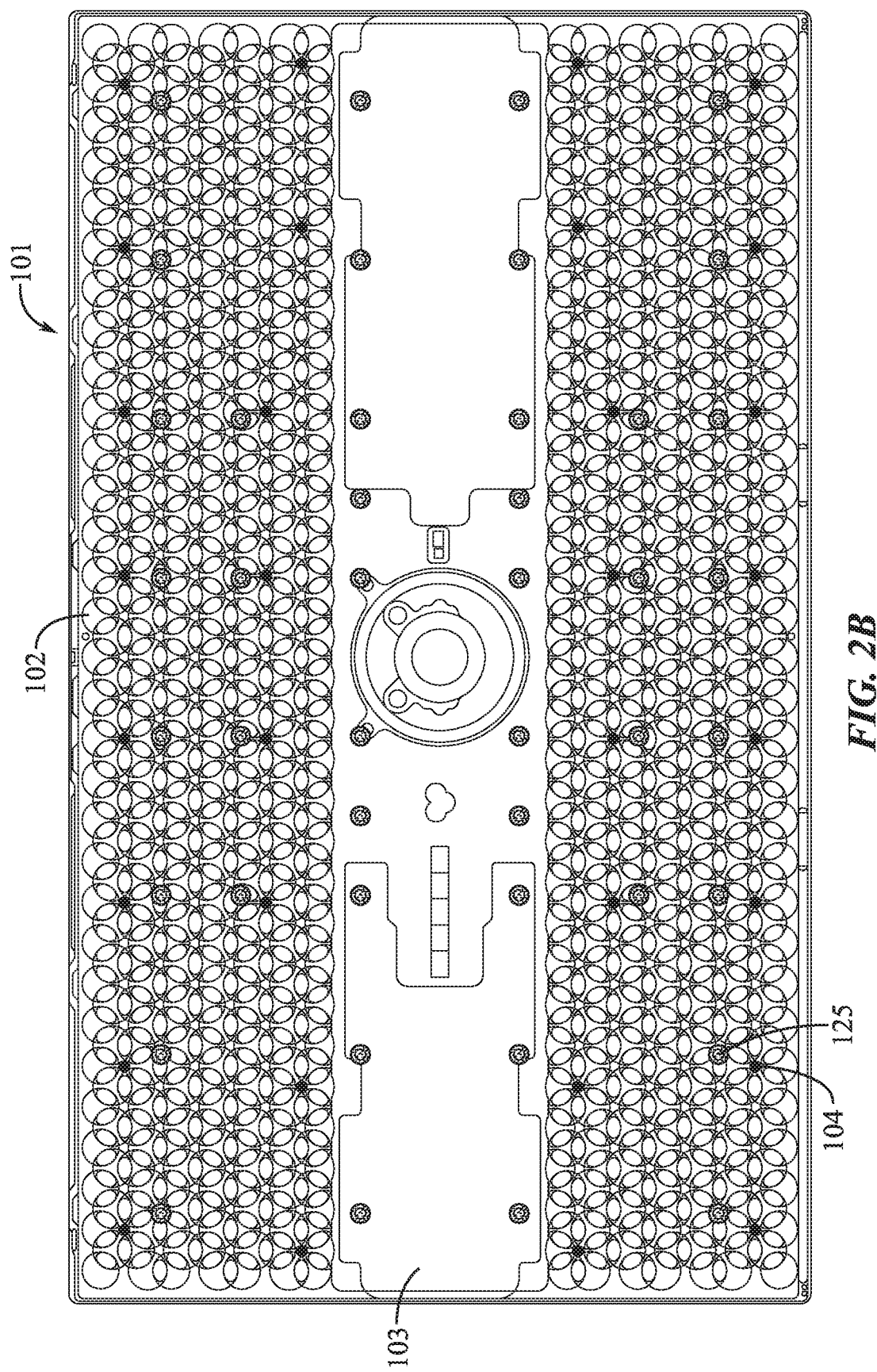
FIG. 2B shows a front view of a component of the electronic device of FIG. 1.

FIG. 2B shows a front view of the housing 101 of the electronic device 100. The housing 101 can be formed from, or can include, regions having a structure as described herein. The structure, such as a structure formed in regions of the housing 101, can include a body having a first surface forming a portion of the exterior of the electronic device 100 and a second surface defining at least part of an internal volume of the housing 101. Additionally, other components of the electronic device 100, such as internal structural components, can be formed from, or can include, regions having a structure as described herein. The structure, such as a structure formed in regions of the housing 101, can include one or more cavities extending into the body from a first surface of a body and one or more cavities extending into the body from a second surface of the body. The one or more cavities extending into the body from the second surface of the body can intersect with, or interfere with, one or more cavities extending into the body from the first surface of the body to form a three-dimensional pattern of apertures or passageways 102 in the body.

The body of a structure, for example, a contiguous structure, can include one or more structures or features formed in, defined by, or extending into the body from one or more of the surfaces of the body. For example, the body can have a generally cuboid shape, a generally spherical shape, a generally cylindrical shape, a generally toroidal shape. In some examples, the body can have a general shape of any polyhedron. In some other embodiments where the three-dimensional pattern extends through one or more regions of the body, the regions can be separated by one or more portions of the body 103 that do not include the three-dimensional pattern. The one or more portions 103 separating the regions of the body that include the three-dimensional pattern or apertures 102 can be substantially continuous. In some embodiments, however, the one or more portions 103 can include structures or features formed in or on the one or more portions 103. As used herein, the term three-dimensional pattern can refer to a positive surface of a structure, or a negative space at least partially enclosed or defined by a surface or a body. The three-dimensional pattern can include one or more irregular shapes, regular shapes, repeating shapes, or combinations thereof.

In some embodiments, a structure of the housing 101 can include, or be formed from, any machinable or formable material. For example, a structure can include or be formed from a material such as a metal, a ceramic, an amorphous material such as glass or an amorphous metal, a polymer, or combinations thereof. In some embodiments, a structure is a metal. In some embodiments, the metal can be an elemental metal or a metal alloy. In some embodiments, the structure can include metals such as aluminum or steel. For example, the structure can be aluminum or an aluminum alloy. In some embodiments, the structure can include a 6000 series aluminum alloy, for example, a 6060, 6061, or 6063 aluminum alloy. In some embodiments, for example, where the structure includes a metal and/or conductive material, the structure can act as an EMC/EMI noise shield The structures described herein, for example, as used in the housing 101 of the electronic device 100, can be formed by a variety of methods and processes. In some embodiments, a structure can be formed by additive and/or subtractive methods such as etching, machining, casting, stamping, forging, forming, injection molding, or the like. Further, multiple methods of forming structures can be employed to form a single structure. For example, one or more cavities extending into the body from a first surface of the body of a structure can be formed by a stamping, a molding, or another forming process, while one or more cavities extending into the body from a second surface of the body of the structure can be formed by a machining or an etching process.

As discussed with respect to FIG. 2A, a number of engagement features 112 can be affixed to the housing 101 at a variety of locations. These engagement features 112 can, for example, be received by receptacles 104 formed in or defined by the housing 101. Further, the receptacles 104 can have a depth that is less than a thickness of the housing 101 at that location. That is, each receptacle 104, in some examples, does not extend all the way through the housing 101. Accordingly, the engagement features 112 can be affixed to the housing so that they protrude into the internal volume defined by the housing, for example, to support and engage with one or more components, as described herein.

In some examples, the engagement features 112 can be distributed across a major surface of the housing 101, for example, a planar major surface surrounded by sidewalls that at least partially defines an internal volume of the device. In some examples, however, the engagement features 112 can be positioned on substantially any surface of the housing 101 that at least partially defines the internal volume. The distribution of the engagement features 112 across an area of the housing 101 can serve to effectively distribute the weight of any components engaged with the engagement features 112 across the housing 101 and can reduce the likelihood of failure of the engagement features when under high stress, for example, during a drop event. The electronic device 100 can include any number of engagement features 112, for example, 1 or more, 5 or more, 10 or more, 20 or more, 30 or more, 50 or more, or even 100 or more. In some examples, the electronic device 100 can include 30 or 32 engagement features 112.

In the present example, the engagement features 112 can be positioned at locations on the structure of the housing 101 between the apertures 102 of a continuous matrix of apertures 102. That is, an engagement feature 112 can be positioned such that the receptacle extends into the body of the housing 101 from a first surface at a location between cavities extending into the body from the first surface and between cavities extending into the body from a second, opposite surface. In some examples, the engagement features 112 can be positioned at locations on a structure including a matrix of aperture or passageways 102 where the structure has a thickest amount of material. Other factors, such as structural considerations, component placement, and thermal considerations can also influence desired location selection for one or more of the engagement features 112.

In some embodiments including a backlight unit 120 having retention features that engage with the engagement features 112, the locations of the retention features and/or the locations of internal components of the backlight unit 120 can influence a desired location of the engagement features 112. In some examples, as described herein, a backlight unit 120 can include internal posts 125 that maintain a thickness of the backlight unit 120 and can carry a load exerted on a major surface of the backlight unit 120 to an opposite major surface thereof. For example, if a force is exerted on the front major surface of the backlight unit 120, such as by a user accidentally exerting pressure on the front of the electronic device 100, the load generated by the force on the backlight unit 120 can be transferred to a rear major surface thereof through one or more posts 125 and into the housing 101 of the device from the backlight unit 120 via the engagement features 112. Accordingly, such a load is transferred from a post 125 through the components of the backlight unit 120 to which the post 125 is affixed, and to the nearest engagement feature or features 112. As such, it can be desirable to minimize a distance between the posts 125 and the engagement features 112 in order to reduce the amount, kind, or width of components of the backlight 120 through which load is transferred. In order to achieve this, the engagement features 112 and the receptacles 104 can be positioned on the housing 101 at locations that are near to the posts 125 of the backlight unit 120 when the device 100 is in an assembled state.

Any number or variety of components in any of the configurations described herein can be included in the electronic device. The components can include any combination of the features described herein and can be arranged in any of the various configurations described herein. The structure and arrangement of components of an electronic device having a housing with structures described herein, and defining an internal volume, as well as the concepts regarding engagement and retention features, can apply not only to the specific examples discussed herein, but to any number of embodiments in any combination. Various embodiments of electronic devices including components having various features in various arrangements are described below, with reference to FIGS. 3-6.

Figure 3:
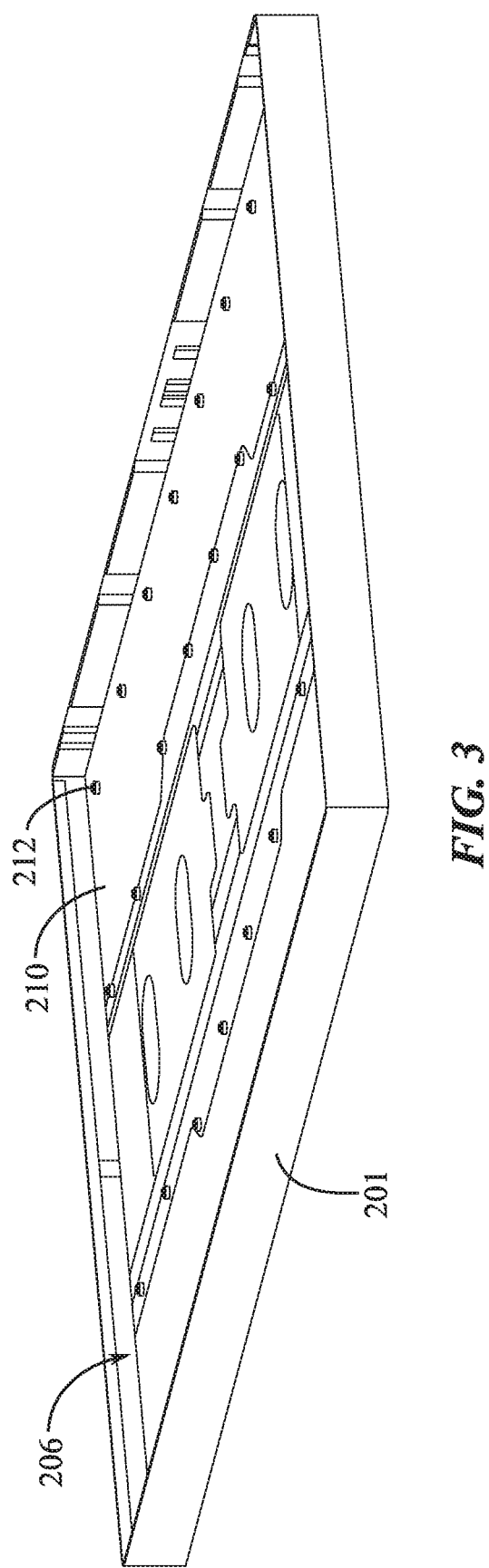
FIG. 3 shows a perspective view of a housing of an electronic device.

FIG. 3 shows a perspective view of a housing 201 of an electronic device 200 including a backplate 210 affixed thereto, and one or more engagement features 212 passing through the backplate 210 and into the housing 201. The housing 201 can be substantially similar to, and can include any of the features of, the housing 101 described with respect to FIGS. 1-2B, while the backplate 210 and engagement features 212 can be substantially similar to the backplate 110 and engagement features 112 described above with respect to FIGS. 1-2B.

In some embodiments where an electronic device 200 is a display device, it can be desirable to prevent the ingress of dust, contaminants, and/or other particulate matter from entering the internal volume 206 defined by the housing 201. For example, dust or particles can undesirably enter the device and migrate in front of the active area of the display, whereupon they can be visible to a user and can cause an undesirable distraction from the display content. In some examples, the housing 201 can have a structure as described herein including a matrix of passageways that allow fluid communication between an interior volume 206 and an ambient environment, for example, to promote airflow there through, and to facilitate device cooling. Accordingly, it is desirable for the backplate 210 to substantially seal the internal volume 206 of the device 200. In some examples, the backplate 210 and housing 201 can provide the internal volume 206 with a substantially watertight or airtight seal.

Further, in some examples, it is desirable for the backplate 210 to substantially abut a surface of the housing 201 from which one or more cavities extend to form a matrix of passageways, as described herein. In such cases, the backplate 210 can aid in conducting heat from components positioned in the internal volume 206 to the structure of the housing 201, whereupon the heat can be emitted into the ambient environment, as described herein. Accordingly, in some examples, the backplate 210 can include a substantially thermally conductive material, such as a metal, for example, a stainless steel alloy.

The backplate 210 can be affixed to the housing 201 by the engagement features 212. Although the backplate 210 can include apertures through which the engagement features 212 can pass, the engagement features 212 themselves can provide an effective dust seal at these locations. In some examples, additional materials, such as a pressure sensitive adhesive, can be applied at or near the apertures to further facilitate this seal. In addition to sealing the interior volume 206 at the apertures in the backplate 210, it can also be desirable to seal the backplate 210 against the housing 201 along a periphery of the backplate 210. Components and methods for achieving this seal are described further with respect to FIG. 4.

Figure 4:
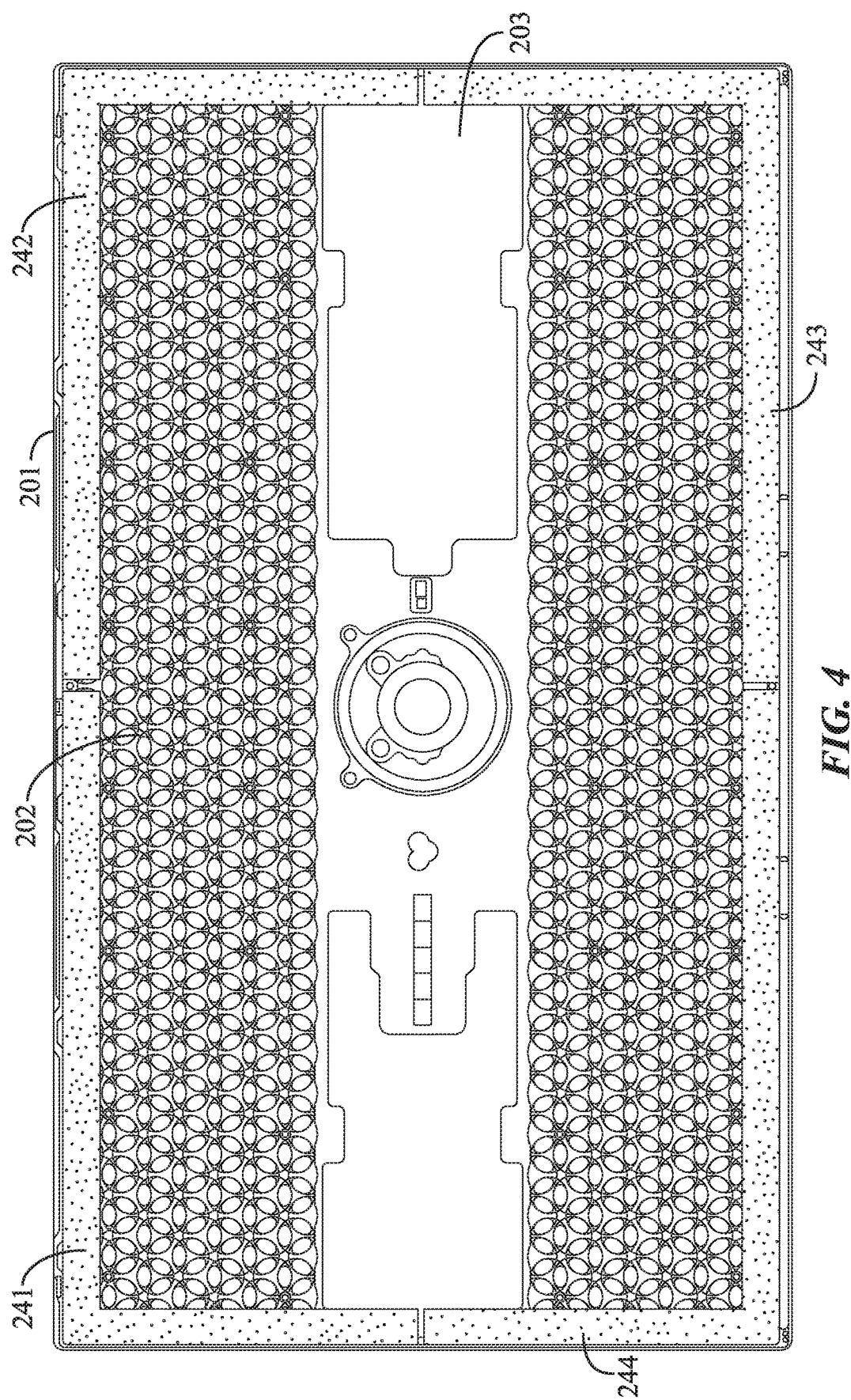
FIG. 4 shows a front view of partially assembled components of the housing of FIG. 3.

FIG. 4 shows a front view of the housing 201 of FIG. 3 having a matrix of apertures or passageways 202 and seal materials 241, 242, 243, 244 positioned at the periphery of the structures of the housing 201, adjacent to the sidewalls. The seal materials 241, 242, 243, 244 can serve to seal the internal volume 206, as described herein, when the backplate 210 is positioned thereover and affixed to the housing 201. In some examples, the seal materials 241, 242, 243, 244 can include substantially any compliant, flexible, and/or deformable material capable of providing an air or water tight seal between two rigid bodies. For example, the seal materials 241, 242, 243, 244 can include a foam, such as a polymer foam. Although the present example includes four approximately "L" shaped pieces of foam 241, 242, 243, 244, it should be understood that substantially any shape, size, and amount of seal material can be used to seal the backplate 210 against the housing 201 about the periphery of the backplate 210.

As can be seen in FIG. 4, in some examples, the foam pieces 241, 242, 243, 244 do not directly contact one another, and a small gap or space can be present between each individual foam piece 241, 242, 243, 244. These gaps or spaces can themselves be sealed with one or more components, as described below with reference to FIGS. 5 and 6.

Figure 5:
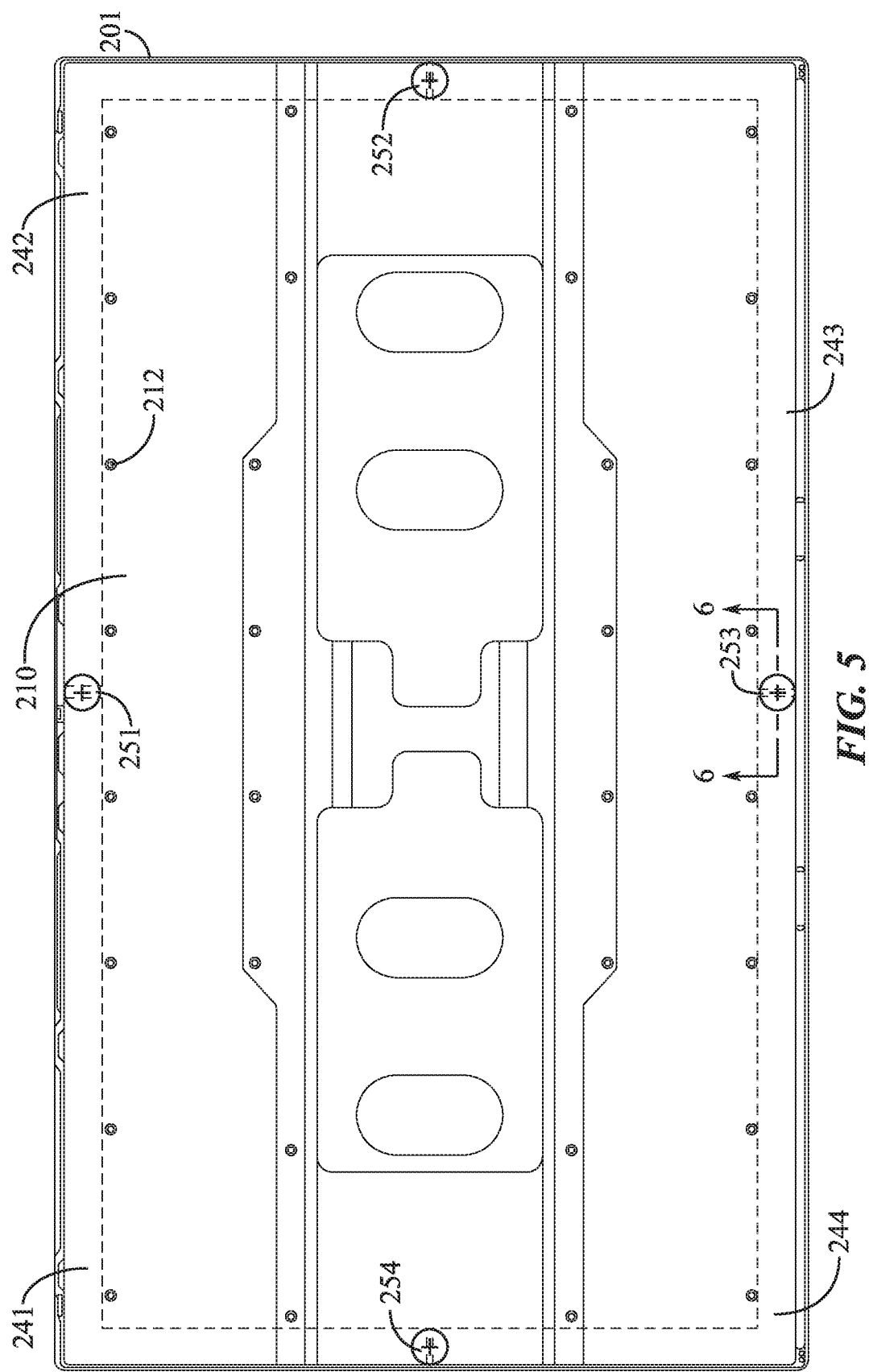
FIG. 5 shows a front view of a select number of components of the housing of FIG. 3.

FIG. 5 shows a front view of the housing 201 including the backplate 210 affixed thereto by the engagement features 212. The backplate 210 can overlay or overlap the foam pieces 241, 242, 243, 244 and can cooperate with them to form the seal between the backplate 210 and housing 201. Further, components 251, 252, 253, 254 can be used to aid in securing the backplate 210 to the housing 201, and to complete the seal therebetween at the gaps between the foam pieces 241, 242, 243, 244. In some examples, the components 251, 252, 253, 254 can pass through an aperture or cut-out in the backplate 210, whereupon they can be received by and retained in the housing 201. In some examples, the components 251, 252, 253, 254 can be screws, posts, bolts, or any other desired component.

Figure 6:
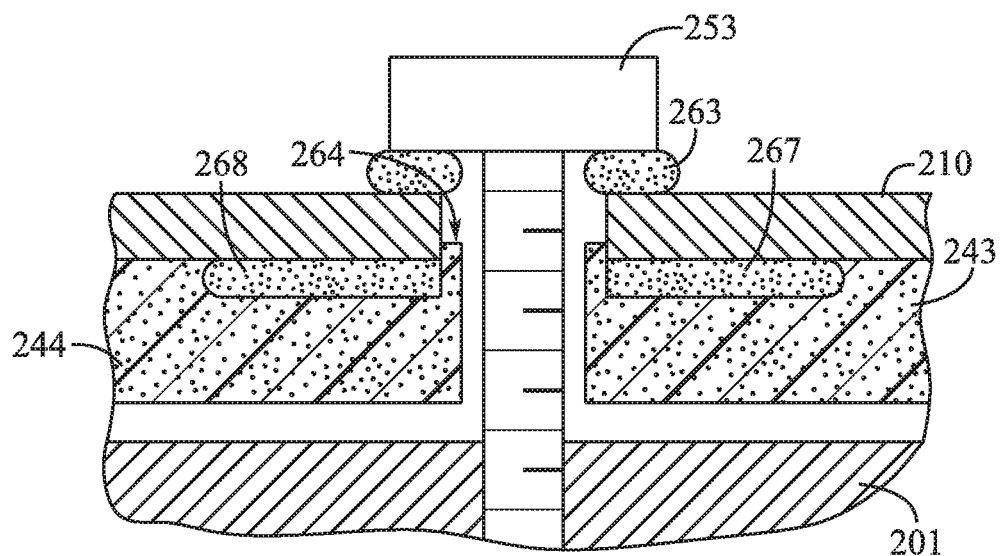
FIG. 6 shows a cross-sectional view of a portion of the housing of FIG. 3.

FIG. 6 illustrates a cross-section of the housing 201 and the backplate 210 shown in FIG. 5, taken along a portion including the component 253 and foam pieces 243, 244. As can be seen, the backplate 210 can overlap or interfere with the foam pieces 243, 244 and can depress or deform the foam pieces 243, 244 to provide a sufficient seal capable of, for example, preventing the ingress of dust or moisture. In some examples, additional material such as adhesive material, for example, a pressure sensitive adhesive 263, 264, 267, 268 can be disposed between the foam pieces 243, 244 and the backplate 210 and/or between the component 253 and the backplate 210. The pressure sensitive adhesive 263, 264, 267, 268 can serve to further reinforce the seal at those locations to which it is provided, for example, to enable an air or water tight seal, while still allowing for a desired level of ease of removal of components from the device, such as the backplate 210. Various embodiments of electronic devices including components having various features in various arrangements are described below, with reference to FIGS. 7A-9D.

Figure 7A:
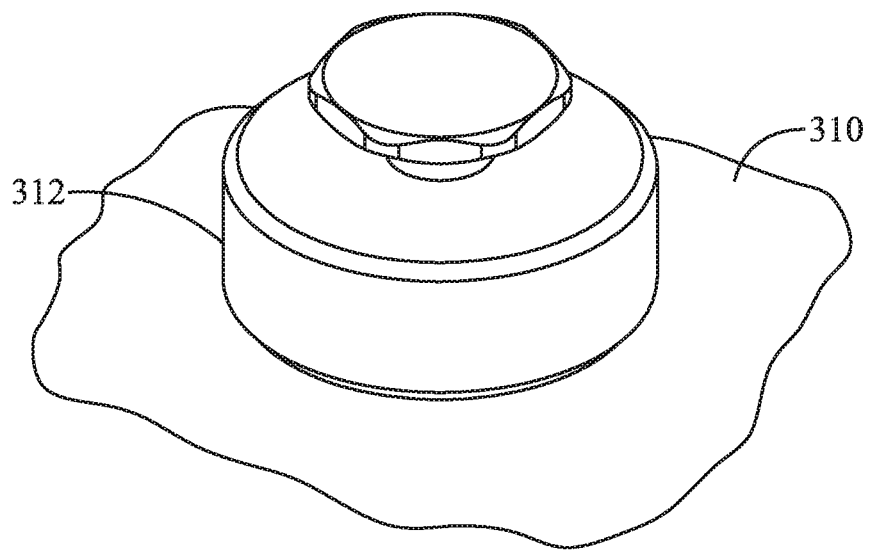
FIG. 7A shows a perspective view of a component of an electronic device.

FIG. 7A shows a perspective view of a portion of a backplate 310 of an electronic device, including an engagement feature 312 passing through the backplate 310. The backplate 310 and the engagement feature 312 can be substantially similar to the backplate 110, 210 and engagement features 112, 212 described with respect to FIGS. 1-6. A portion of the engagement feature 312 can pass through an aperture in the backplate 310, whereupon it can be received by and retained in the housing.

Figure 7B:
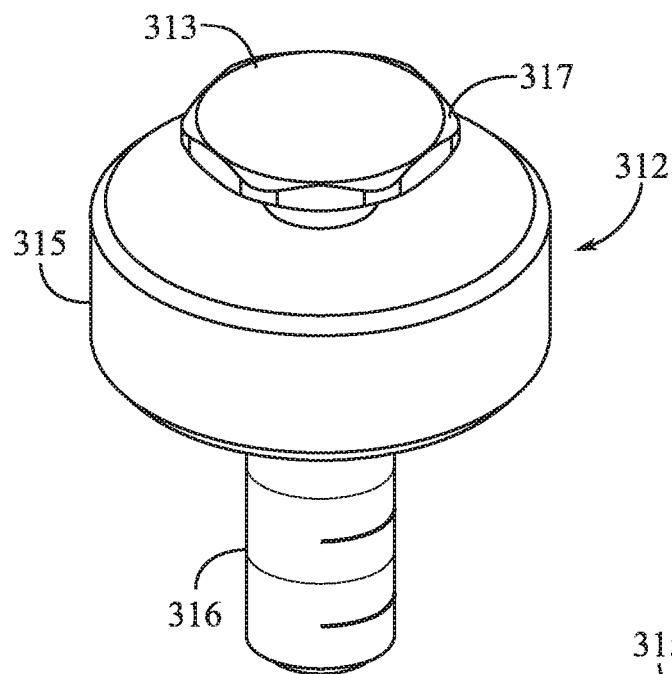
FIG. 7B shows a perspective view of the component of FIG. 7A.

FIG. 7B shows an isometric view of the engagement feature 312. The engagement feature 312 can include a base 315, and a post 316 extending therefrom. Referring again to FIG. 7A, the post 316 can pass through an aperture in the backplate 310 to be received by the housing or an underlying component, while the base 315 is larger than the aperture and can be positioned substantially adjacent to a surface of the backplate 310. Although illustrated as having a cylindrical shape, the base 315 can have any desired shape as long as it is wider than the post 316 and the aperture through which the post 316 can pass. While not illustrated in FIG. 7B, any number of engagement features, such as threads, channels, tracks, lobes, or holes can be formed in or on the post 316 to couple or otherwise secure the engagement feature 312 to the housing. The base 315 can include a first surface that can contact or abut the backplate 310 during use, and an opposing second surface on which a component engaged with the engagement feature 312 can be supported, thereby transferring a load from the component to the backplate 310 or housing. The base 315 can, in one example, have a diameter or width of about 6 mm and the post 316 can have a length of about 4 mm, although any desired diameter or length can be used.

Figure 7C:
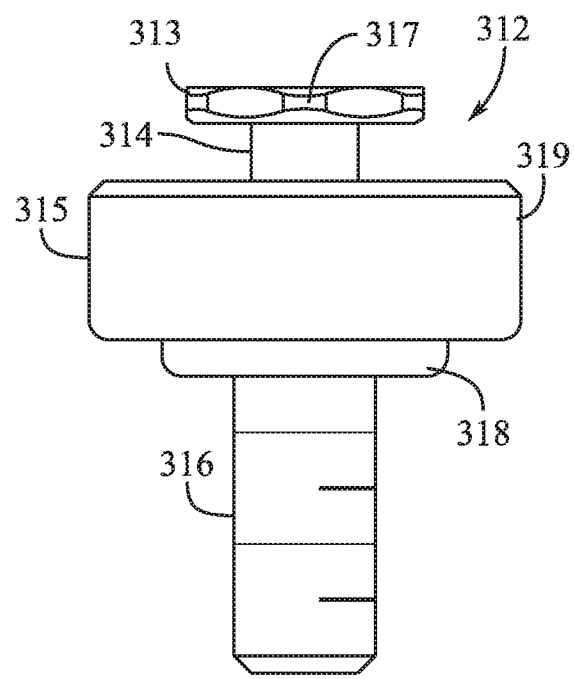
FIG. 7C shows a side view of the component of FIG. 7A.

The engagement feature 312 can further include a top portion or head 313 that can be connected to the base 315, for example, by a shaft 314, shown in FIG. 7C. As described further herein, the head 313 can be sized to correspond to an aperture of a retention feature formed in a component of an electronic device, such as a backlight unit. The head 313 can have any desired shape, and in some examples, can be circular or hexagonal. Further, the head 313 can have a diameter or width that is less than the diameter or width of the base 315, for example, about 4 mm, although any desired dimension can be used. The head 313 can also include a slanted, curved, chamfered, or beveled edge 317 along all or a portion thereof. In some examples, this bevel can allow a retention feature of a component, such as a backlight unit, to be lowered onto the engagement feature 312 at an angle, for example, during an assembly process, as described herein.

The head 313 can also have a thickness of about 0.5 mm, although any desired thickness can be used.

The shaft 314 connecting the head 313 to the base 315 can be any desired shape, although in some examples, it can be circular or cylindrical. As described further herein, the shaft 314 can have a width or diameter corresponding to an orifice or aperture of a retention feature, and can have a diameter or width less than a diameter or width of the head 313. For example, the shaft 314 can have a diameter of about 1.5 mm, although any desired dimension can be used. As can be seen in FIG. 7C, in some embodiments, the base 315 can have a tiered or stepped structure including a lower portion 318 that has a smaller diameter or width than a main portion 319. In some examples, this lower portion 318 can define the surface that abuts an adjacent component, such as a backplate 310. The lower portion 318 can have a diameter of about 4 mm and a thickness of about 0.5 mm, although any desired dimensions can be used.

Figure 7D:
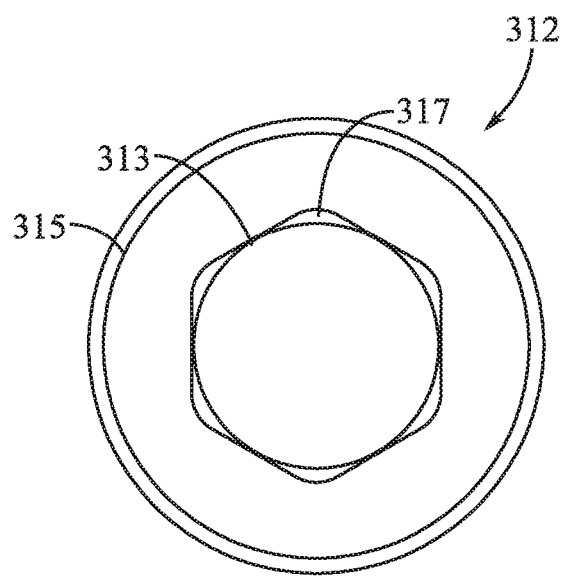
FIG. 7D shows a top view of the component of FIG. 7A.

FIG. 7D shows a top view of the engagement feature 312 including the head 313 and the base 315. FIG. 7D illustrates that the diameter or width of the head 313 is less than the diameter or width of the base 315 so that an orifice or aperture of a retention feature sized to correspond to and pass over the head 313 will not be able to pass over or receive the base 315 of the engagement feature 312. This size coordination results in the engagement feature 312 supporting the component that defines the retention feature, as described further herein. Additional details of the display components are provided below, with reference to FIG. 8.

FIG. 8 shows a rear view of a display component of an electronic device, for example, a backlight unit 320. The backlight unit 320 can be substantially similar to the backlight unit 120 described with respect to FIGS. 1-2B. While the front or active surface (not shown) of the backlight unit 320 can include a number of components, such as LEDs and reflectors, FIG. 8 illustrates a rear surface of the backlight unit 320 including a carrier plate 321, on which the components of the backlight unit 320 can be disposed or carried. In some embodiments, the carrier plate 321 can include or be formed from metal, polymer, ceramic, or combinations thereof. In some examples, the carrier plate 321 can include a thermally conductive material, such as metal, for example, stainless steel. The carrier plate 321 can facilitate the transfer of heat from the components of the backlight unit 321 to other parts of the device, such as the housing, as described herein.

As can be further seen in FIG. 8, the carrier plate 321 of the backlight unit 320 can at least partially define one or more retention features 322. A retention feature 322 can include an aperture or an orifice defined by the carrier plate 321, as described in further detail herein. In some examples, the number and position of the retention features 322 can correspond at least to the number and position of the engagement features of the device, such as engagement features 112, 212, and 312 described herein. Accordingly, in some examples, the carrier plate 321 can define 30 or 32 retention features 322. Alternatively, the number and position of the retention features 322 can be greater than that of the engagement features, provided that there is a retention feature corresponding to each engagement feature 112, 212, and 312. Additional details of the retention features is provided below, with reference to FIGS. 9A-9D.

FIG. 9A shows a view of one such retention feature 322, as defined by the carrier plate 321 of the backlight unit 320. In this example, the carrier plate 321 can define a first orifice or aperture 323, and a second orifice or aperture 324 having a diameter smaller than a diameter of the first orifice 323 that intersects with or overlaps with the first orifice 323. Although illustrated has having circular shapes, the orifices 323, 324 can have substantially any shape, and can further correspond to the shape of the head 313 and shaft 314 of a corresponding engagement feature 312, as described herein. The first orifice 323 and the second orifice 324 can overlap with one another to form a single opening or orifice of the retention feature 322, similar to a key-hole profile. In some examples, the portion of the carrier plate 321 defining the retention feature 322 can have a chamfered or beveled edge 325 to facilitate assembly of the device and engagement of an engagement feature 312 with the retention feature 322.

FIG. 9B shows the retention feature 322 aligned with a corresponding engagement feature 312 prior to an engagement therebetween. As can be seen, the diameter of the first orifice 323 can be the same or a slightly larger diameter than the diameter of the head 313, to allow the head to pass completely through the first orifice 323 during insertion. The diameter of the first orifice 323 can also be smaller than the diameter of the base 315 so that the carrier plate 321 can abut the base 315 when the engagement feature 312 is fully received by the retention feature 322. Further, the diameter of the second orifice 324 can be less than the diameter of the head 313 and equal to or greater than the diameter of the shaft 314 so that the head 313 and base 315 extend outside the perimeter of the second orifice 324, when the shaft 314 is positioned therein.

Figure 9C:
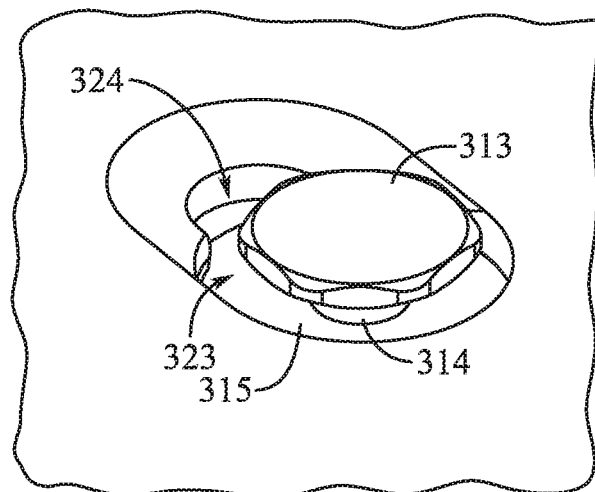
FIG. 9C shows a perspective view of the portion of the component of FIG. 8 engaging the second component of the electronic device.

In order to engage the engagement feature 312 and retention feature 322, as shown in FIG. 9C, the head 313 of the engagement feature 312 is passed through the first orifice 323 until the base 315 abuts the carrier plate 321. During assembly of a device including a backlight unit 320 and engagement features 312, this can be achieved by lowering the backlight unit into the internal volume in a position where the first orifice 323 of the retention features 322 are aligned with the engagement features 312, as described further herein. In the position illustrated in FIG. 9C, the backlight unit 320 including the carrier plate 321 defining the retention feature 322 can be removed from the engagement feature 312 by moving the backlight unit along the axis defined by the shaft 314, to pass the head 313 back out of the retention feature 322.

Figure 9D:
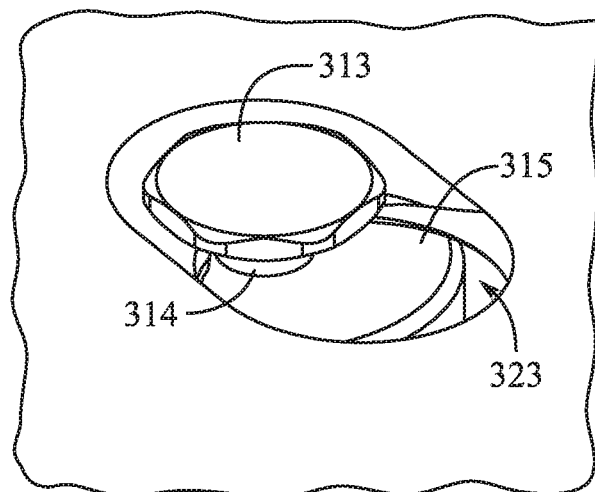
FIG. 9D shows a perspective view of the portion of the component of FIG. 8 engaging the second component of the electronic device.

FIG. 9D illustrates the engagement feature 312 fully engaged with the retention feature 322 to retain the backlight unit 320. As can be seen, the backlight unit 320 has been translated laterally relative to the engagement feature 312, for example, by sliding, so that the retention feature 322 is also translated laterally relative to the engagement feature 312 in such a way that the shaft 314 is disposed in the second orifice 324. As shown in FIG. 9D, when the engagement feature 312 and retention feature 322 are arranged in this position, the carrier plate 321 is positioned between the head 313 and the base 315 of the engagement feature so that any movement of the carrier plate 321, and thus backlight unit 320, along the axis of the shaft 314 is prevented, thereby retaining the backlight unit 320 on the housing to which the engagement feature 312 is attached. Various embodiments of electronic devices including components having various features in various arrangements are described below, with reference to FIGS. 10A-10C.

FIG. 10A shows a cross-sectional view of an electronic device 400. The electronic device 400 can be substantially similar to the electronic device 100, 200 described with respect to FIGS. 1-6. The electronic device 400 can be, for example, a display device and can include a housing 401 including a matrix of passageways 402 that at least partially defines an internal volume 406 of the device 400. The housing 401 can be substantially similar to the housing 101, 201 described herein with respect to FIGS. 1-6. The device 400 can also include a backplate 410, engagement features 412, and a backlight unit 420. The backplate 410 can be substantially similar to the backplate 110, 210 described with respect to FIGS. 1-6, while the backlight unit 420 can be substantially similar to the backlight unit 120, 320 described with respect to FIGS. 1-2B and 8-9D and the engagement feature 412 can be substantially similar to the engagement feature 112, 212, 312 described with respect to FIGS. 1-9D.

FIG. 10A shows the device 400 during a stage of assembly where the backlight unit 420 has been inserted into the internal volume 406 so that the head 413 of the engagement feature 412 passes through the retention feature 422 defined by the backlight unit 420 and the shaft is still in the first orifice 423 of the retention feature 422. In the example illustrated in FIG. 10A, the backlight unit 420 can be lowered into the internal volume 406 in a vertical manner, or by tilting the backlight unit 420 into the internal volume from an initial starting angle. Further, although only one engagement feature 412 and retention feature 422 are illustrated, it should be understood that the device 400 can include any number of features 412, 422, as described herein.

As shown, the post of the engagement feature 412 can extend through the backplate 410 and into a receptacle 403 defined by the housing 401. The receptacle 403 can extend into the housing 401 from a surface at least partially defining the internal volume 406, and can have a depth less than a thickness of the housing 401 at that location. The position of the receptacle 403 between the cavities that make up the matrix of passageways 402 can also be seen. In some examples, the receptacle 403 can be threaded and the post can include threads corresponding to the threads of the receptacle 403 that mesh to secure the engagement feature 412 to the housing 401. In some examples, the engagement feature 412 can additionally or alternatively be secured in the receptacle by other methods, such as by brazing, welding, other attachment features, or by an adhesive.

The housing 401 can also include a lip 404 extending from a sidewall at least partially defining the internal volume 406. The lip 404 can extend a desired distance away from the sidewall, and in some examples, can extend substantially perpendicularly therefrom into the internal volume 406. The lip 404 can be sized, in some examples, so that a distance between the lip 404 and the opposing sidewall of the housing 401 is equal to, or greater than, a height or width of the backlight unit 420, thereby allowing the backlight unit 420 to be inserted horizontally into the internal volume 406 past the lip 404. In other examples, the backlight unit 420 can be inserted under the lip 404 and pivoted into the internal volume 406

Figure 10B:
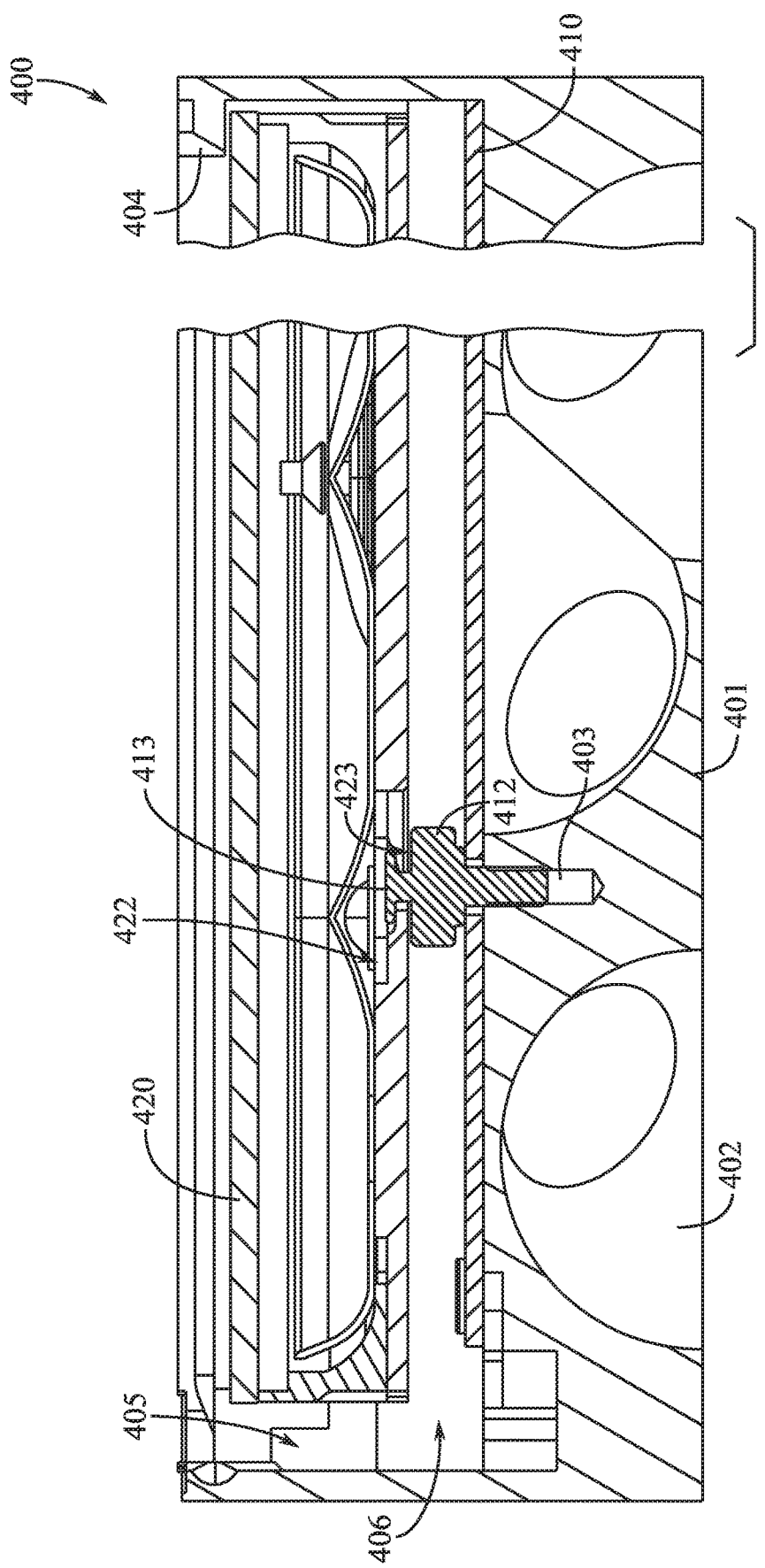
FIG. 10B shows a cross-sectional view of a portion of the electronic device of FIG. 10A.

FIG. 10B shows a subsequent stage in the assembly process of the device 400 whereupon the backlight unit 420 has been translated laterally, for example, by sliding, so that the lip 404 now overhangs or overlaps at least a portion of the backlight unit 420. Thus, the backlight unit 420 is now positioned within the internal volume 406 so that a portion of the backlight unit 420 occupies the space under the lip 404, and a gap or space 405 having a size corresponding to the size of the lip 404 is present between a sidewall of the housing 401 and the backlight unit 420 at a location opposite the sidewall including the lip 404. In some examples, the backlight unit 420 can abut the housing 401 under the lip 404. In some other examples, however, additional components, such as rubber bumpers, springs, or other compressible biasing members can be positioned between the housing 401 and the backlight unit 420 at this location to provide a biasing force against insertion of the backlight unit 420 directly abutting the housing 401 under the lip 404.

In some examples, the lip 404 can extend from a top sidewall of the housing 401, that is, a sidewall defining a top surface of the internal volume 406 when the device 400 is in an orientation for use by a user. The lip 404 can also extend any appropriate distance, including about 1 mm, about 2 mm, about 3 mm, about 5 mm, or about 10 mm from the sidewall. Thus, the space between the installed backlight unit 420 and the sidewall of the housing 401, opposite the lip 404, can also be about 1 mm, about 2 mm, about 3 mm, about 5 mm, or about 10 mm.

While the carrier plate of the backlight unit 420 can define the retention feature 422 as described with respect to FIGS. 8-9D, components of the backlight unit 420 positioned adjacent to the carrier plate can also have a portion removed therefrom or can define an aperture at a location adjacent to the retention feature. For example, a printed circuit board can be positioned adjacent to the carrier plate, and a portion of the printed circuit board adjacent to the retention feature 422 can also have an aperture therein, or can have at least a portion removed therefrom. While the engagement feature 412 does not, in some examples, extend into the aperture of the printed circuit board when the engagement feature 412 is within the retention feature 422, the removal of a portion of the printed circuit board can prevent wear or the creation of debris caused by abrasion from the sliding of the backlight unit 420 relative to the engagement feature 412 at that location, thereby reducing the risk of particulate matter or debris being present in the internal volume 406.

Additionally, the retention feature 422 can be positioned at a location on the backlight unit 420 that can be between the internal components thereof. For example, if the backlight unit 420 includes reflectors, such as a cavity reflectors, the retention feature 422 can be positioned at a location on the backlight unit 420 that is disposed between the cavity reflectors. This can ensure that the engagement feature 412 is not at risk of abutting or interfering with the cavity reflectors. Additionally, the position of the engagement features 412 on the housing correspond to the position of the retention features 422, so the engagement feature positions can also be selected to be positioned between the cavity reflectors of the backlight unit 420.

The lateral translation or sliding of the backlight unit 420 relative to the housing 401 can also cause the retention feature 422 to translate with respect to the engagement feature 412 to fully engage the engagement feature 412 and the retention feature 422, as described with respect to FIGS. 9B-9D. In other words, the translation of the backlight unit 420 relative to the housing 401, illustrated in FIGS. 10A and 10B, can simultaneously cause the translation between the retention feature 322 and the engagement feature 312 illustrated in FIGS. 9C and 9D. Accordingly, movement of the backlight unit 420 relative to the housing along the axis of the shaft of the engagement feature 412 is prevented.

Figure 10C:
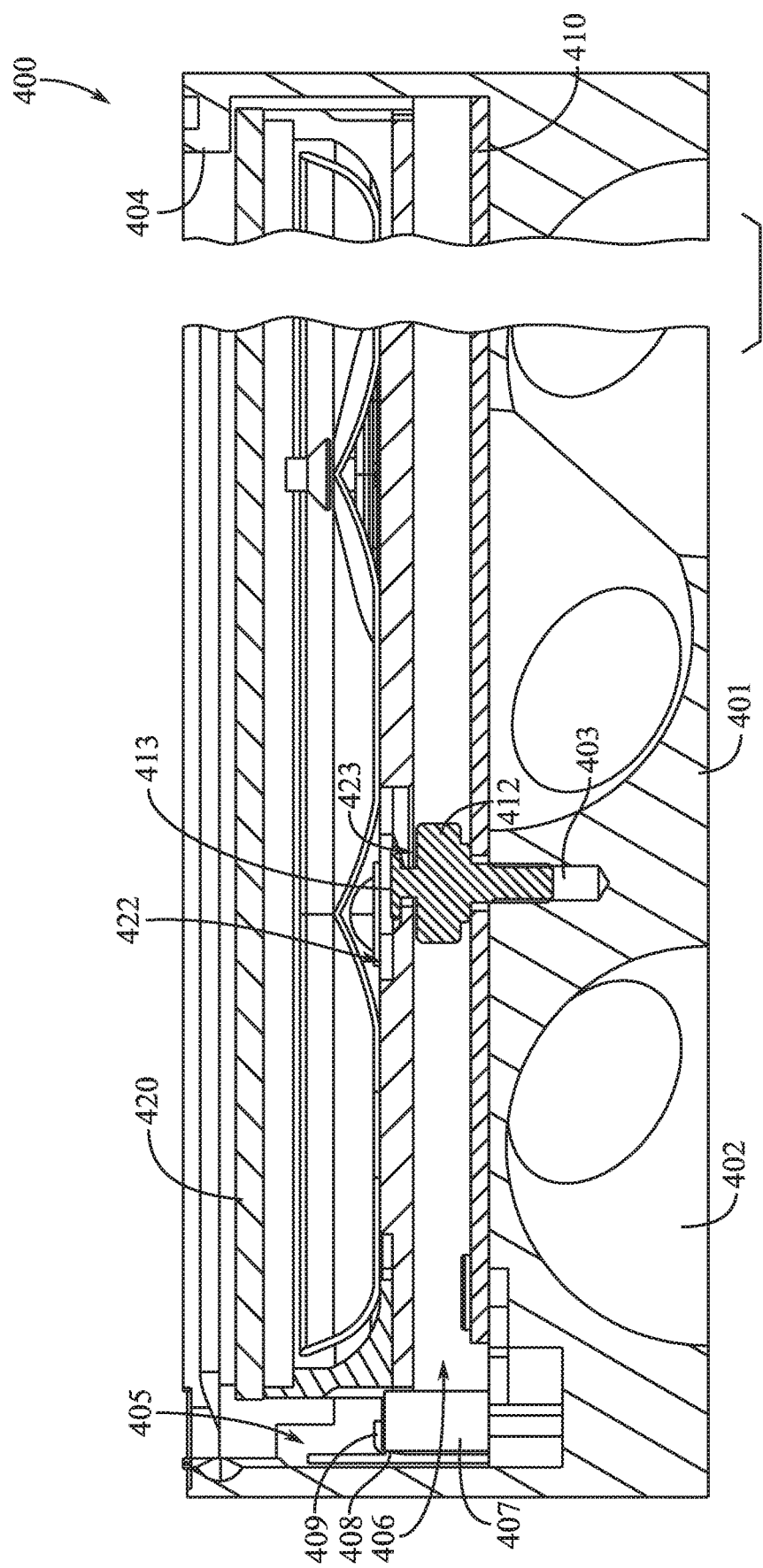
FIG. 10C shows a cross-sectional view of the electronic device of FIG. 10A.

While movement along the axis of the shaft of the engagement feature 412 is prevented by the configuration shown in FIG. 10B, additional components can be inserted or incorporated to prevent lateral motion of the backlight unit 420 relative to the housing 401, such that the engagement features 412 could not unintentionally disengage from the retention features 422. Accordingly, a securing component or components 407, 408 can be positioned between the backlight unit 420 and the housing 401, as shown in FIG. 10C.

In some embodiments, a securing component can include a shaft or a pin 407 and a shim 408 that are inserted into or positioned in the space between the backlight unit 420 and a sidewall of the housing 401. The pin 407 can include a threaded portion that can extend into and engage with corresponding threads in the housing 401, although other forms of retaining the pin 407 can be used. The pin 407 is positioned so that it abuts a portion of the backlight unit 420. When the device is in use, the pin 407 can support some or all of the weight of the backlight unit 420, and can prevent the backlight unit from unintentionally translating relative to the housing 401, such that the backlight unit might disengage from the engagement features 412.

In some examples, a shim 408 can be position in a space or gap between the pin 407 and a sidewall of the housing 401. The shim 408 can contact or abut both a first surface of the pin 407 and the housing 401. Further, the shim can include a lip or a flange 409 that extends from a body of the shim 408 to abut a second surface of the pin 407. This flange 409 of the shim 408 can, for example, prevent the pin from unintentionally backing out of the housing 401.

The device 400 can include a pin 407 and a shim 408 positioned at each of the lower corners of the device, when in an orientation configured for use by a user. While any number of securing components can be used, in some examples, the device 400 can include 2 securing components, each positioned at or near a lower corner of the device, and including both a pin 407 and a shim 408. As the securing component can support some or all of the weight of the backlight unit 420, in some examples, a securing component can include a relatively strong material, such as relatively strong metal, plastic, ceramic, or combination thereof. In some examples where the securing component includes both a pin 407 and a shim 408, the pin 407 and the shim 408 can include a metal such as stainless steel. Further, because the securing component can occupy the entire gap or space between the backlight unit 420 and the housing 401, the securing component can effectively transfer load from the backlight unit 420 directly into the housing without breaking or deflecting, for example, during a drop event. Details regarding the configuration of the finally assembled device 400 are detailed below, with reference to FIGS. 11-12C.

Figure 11:
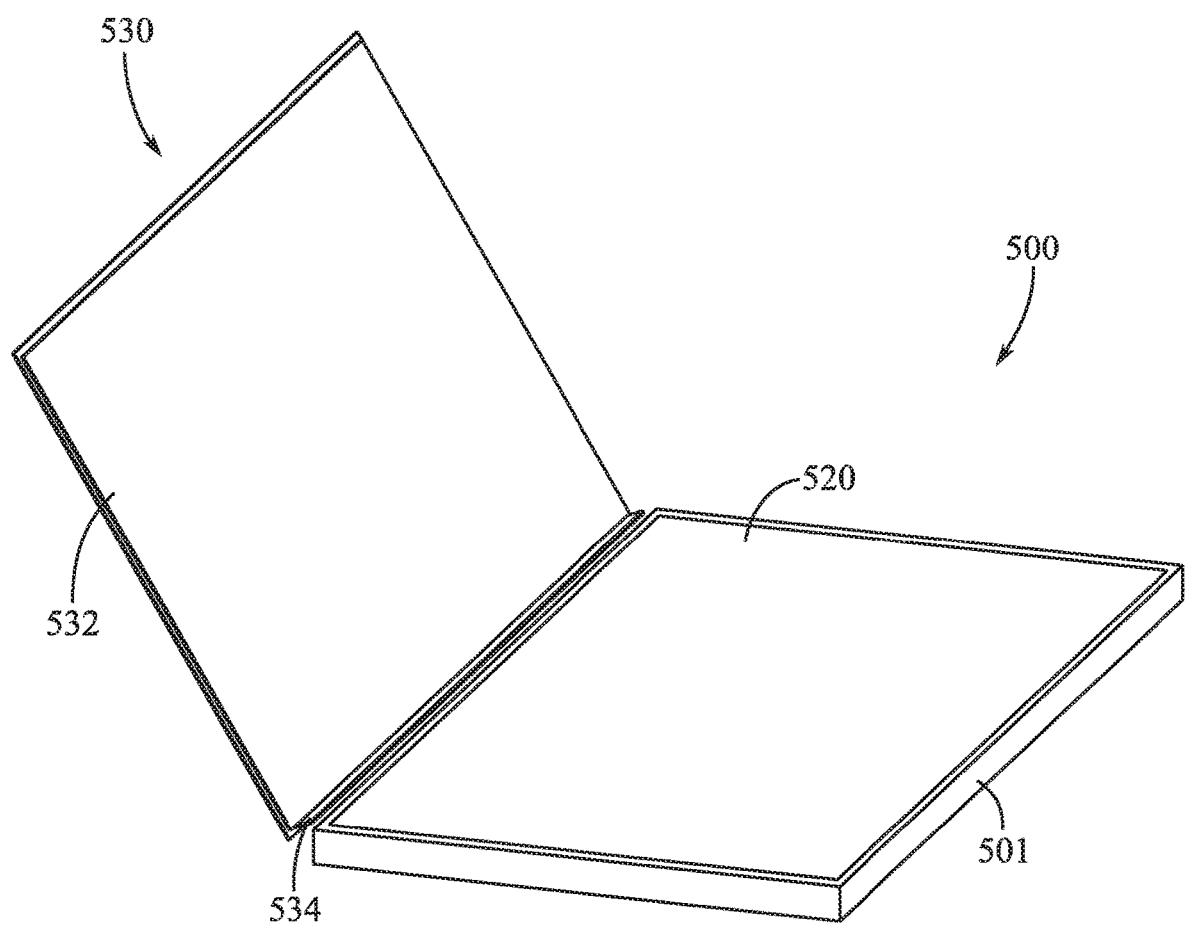
FIG. 11 shows a perspective view of components of an electronic device.

FIG. 11 shows a perspective view of an electronic device 500 in a state of assembly. The electronic device 500 can be substantially similar to electronic device 100, 200, 400 described herein, and can be a display device including a component such as backlight unit 520 secured to a housing 501, for example, as described with respect to backlight unit 420 and housing 401 in FIGS. 10A-10C. The device 500 can also include a cover assembly 530 that can be substantially similar to cover assembly 130, and can include a cover 532 and a component such as one or more daughterboards 534, extending in a substantially perpendicular orientation therefrom. The cover assembly 530 is shown positioned relative to the housing 501 and backlight unit 520 of the device 500, prior to fixture thereto.

Figure 12A:
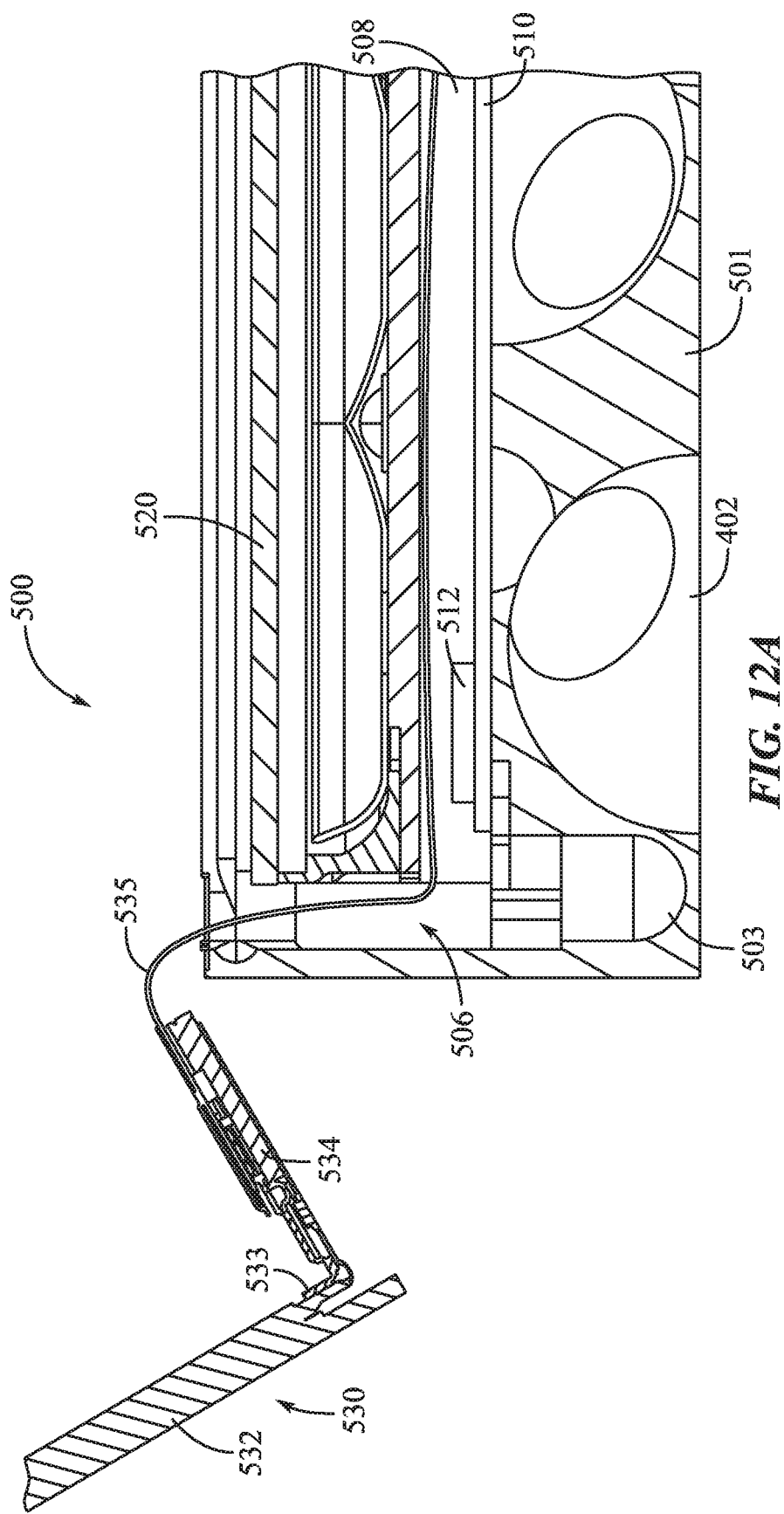
FIG. 12A shows a cross-sectional view of a portion of a partially assembled electronic device.

FIG. 12A shows a cross-sectional view of the device 500 shown in FIG. 11, including the housing 501, backplate 510, backlight unit 520 and cover assembly 530. The cover assembly 530 can include a cover 532 that can include a display unit, such as an LCD display unit affixed thereto, as described herein. The cover assembly 530 can also include daughterboards 534 that are attached to a bracket 533 that is attached to, and extending from, the cover 532 to hold the daughterboards 534 substantially perpendicular to the cover 532 to facilitate assembly of the device 500, as described herein. The bracket 533 can be adhered or coupled directly to a portion of the cover 532, such as a cover glass, or to other locations on the cover 532. The daughterboards 534 can be electrically connected to the cover 532, for example, to a display unit thereof. Additionally, a flexible electrical connector 535 can extend from the daughterboards 534 into the internal volume 506 in a channel 508 between the backlight unit 520 and the housing 501, where it can be connected to one or more components.

The housing 501 can define a recess 503 that can be disposed below or adjacent to the daughterboards 534 when the device 500 is in a fully assembled state, as described further herein. The portion of the housing 501 defining the recess 503 can be rounded, substantially cylindrical, or spherical, such that a periphery of the recess 503 has a rounded shape or incorporates a radius on its peripheral profile. In some examples, the recess 503 can have a diameter of about 8 mm, although any desired dimension can be used. Additionally, the recess 503 can be disposed between the securing elements of the device 500, for example, between two securing elements positioned at lower corners of the device 500 as described with respect to FIG. 10C. A bump or protrusion 512 can also be disposed on or be defined by the housing 501 at a location near or adjacent to the recess 503 under the backlight component 520.

Figure 12B:
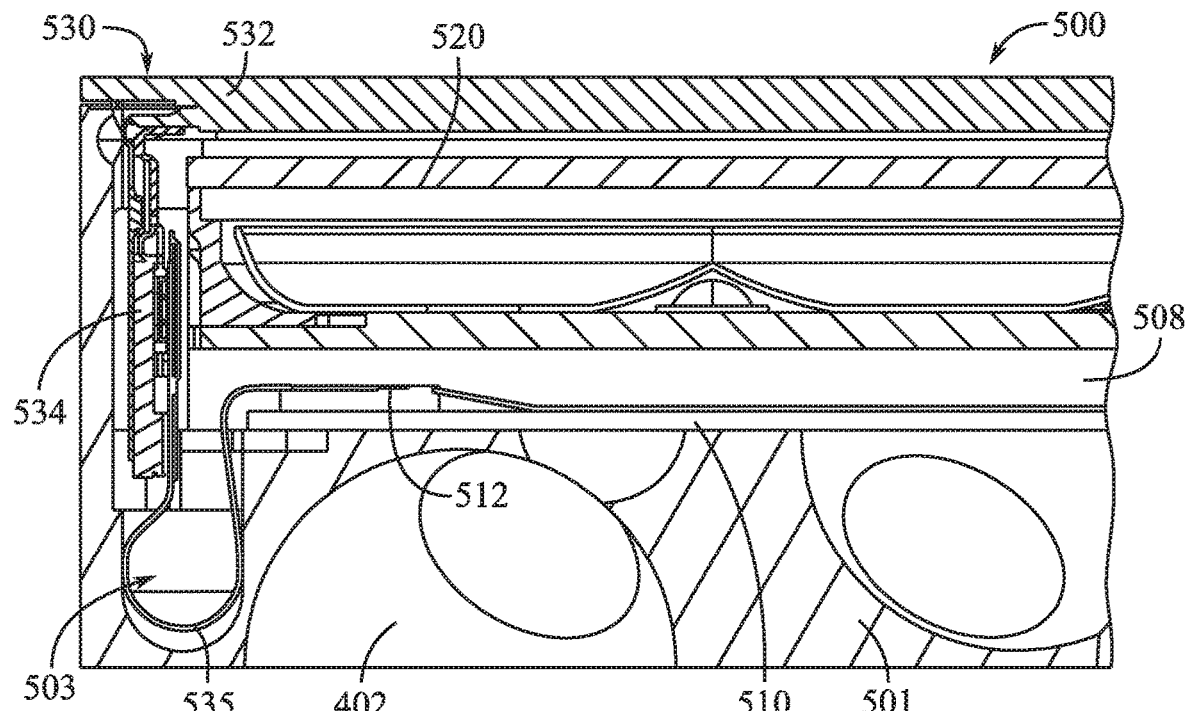
FIG. 12B shows a cross-sectional view of a portion of the electronic device of FIG. 12A.

FIG. 12B shows the device 500 including the cover assembly 530 positioned in its assembled configuration. This position of the cover assembly 503 can be achieved by rotating the cover assembly 530 relative to the housing 501 from the position shown in FIG. 12A, and lowering the cover assembly 530 towards the housing 501 until the position illustrated in FIG. 12B is achieved. As shown in FIG. 12B, the recess 503 and the protrusion 512 can allow the flexible connector 535 to be pushed into the internal volume 506 in a manner such that the flexible connector 535 rolls around the periphery of the recess 503 and over the protrusion 512, rather than merely crumpling or buckling during insertion. In this way, problems caused by the irregular or undesired crumpling, buckling, or movement of the flexible connector 535 can be reduced, while the flexible connector 535 can be retained in a desired location in the internal volume 506.

Further, the flexible connector 535 can exert a spring force in this position such that the flexible connector 535 attempts to enter a flat or straight state, but is prevented from doing so by the recess 503. The flexible connector 535 can exert a force against the recess 503 and can be positioned against a periphery thereof, for example, a portion or an entire periphery thereof. Accordingly, the flexible connector 535 can extend in a first direction from the daughterboards 534 towards and into the recess 503, whereupon the flexible connector 535 can bend around a periphery of the recess 503 and exit therefrom in a second direction that can be angled or perpendicular to the first direction. The flexible connector 535 can extend in this second direction along a channel 508 between a component, such as the backlight unit 520, and the housing 501 that can include the protrusion 512. Thus, the flexible connector 535 can pass over the protrusion 512, eliminating a 90 degree turn into the channel 508, that could crumple or buckle the flexible connector 535.

Figure 12C:
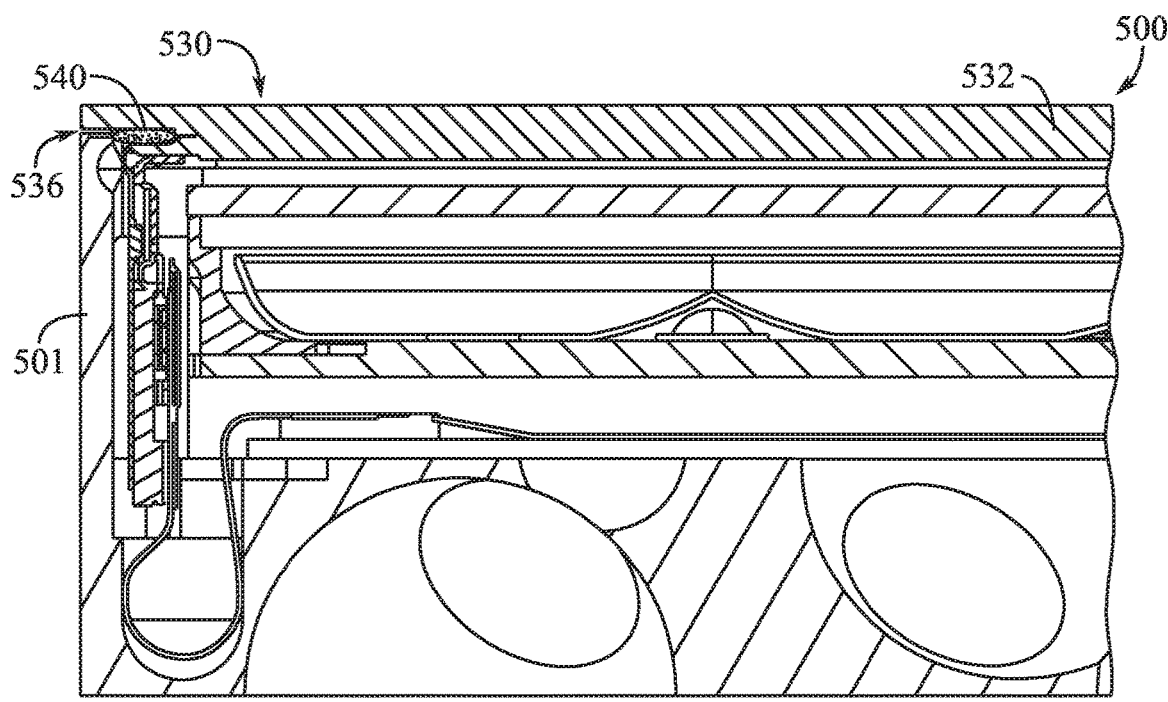
FIG. 12C shows a cross-sectional view of a portion of the electronic device of FIG. 12A.

FIG. 12C shows the device 500 in an assembled state where the cover assembly is fixed to the housing 501, for example, by an adhesive positioned along a periphery thereof. In some examples, the cover assembly 530 can be disposed on and at least partially supported by the housing 501 or components of the device 500 prior to being affixed thereto. In this position, a gap or a space 536 can exist between a periphery of the cover assembly 530 and the housing 501. In some examples, this gap 536 can have a width of less than about 1 mm, or less than about 0.5 mm, for example, about 0.2 mm.

In some examples, a reworkable adhesive 540 can be inserted through the gap 536 to a space into the internal volume 506 whereupon it can adhere or fix the cover assembly 530 to the housing 501, and provide a substantially air or water tight dust seal for the internal volume. In some examples, this adhesive 540 can be a reworkable pressure sensitive adhesive, such as a reactive hot melt pressure sensitive adhesive. Further, the adhesive 540 can be applied or inserted through the gap 536 as a single component material in a warm or heated state, whereupon it can subsequently cool and/or react with ambient moisture to fix the cover assembly 530 to the housing 501. In some examples, the adhesive 540 can include a polymer or polymers capable of one or more forms of cross-linking, and in a cooled state can include a cross-linked urethane polymer network. In some examples, the adhesive 540 can include polyurethane. The adhesive 540 can adhere to the materials of the cover assembly 530 and housing 501, including metals such as aluminum or stainless steel, ceramics such as glass, and plastics.

Further, due to the reworkable nature of the adhesive 540, the adhesive 540 can be reheated and removed as a substantially unitary component from the device 500 through the gap 536 if disassembly of the device 500 is desired, for example, to facilitate repair or recycling of one or more components of the device 500. Accordingly, in some examples, the temperature range to release the reworkable adhesive 540 can be greater than a temperature of the adhesive location during regular operation of the device 500, but less than a temperature that would damage the components adjacent to the adhesive 540. In some examples, the adhesive 540 can be substantially chemically or environmentally inert, can be opaque or non-transparent, and can have a color, such as matte black. Various methods for assembling electronic devices, including components having various features in various arrangements, are detailed below, with reference to FIGS. 13-14.

Figure 13:
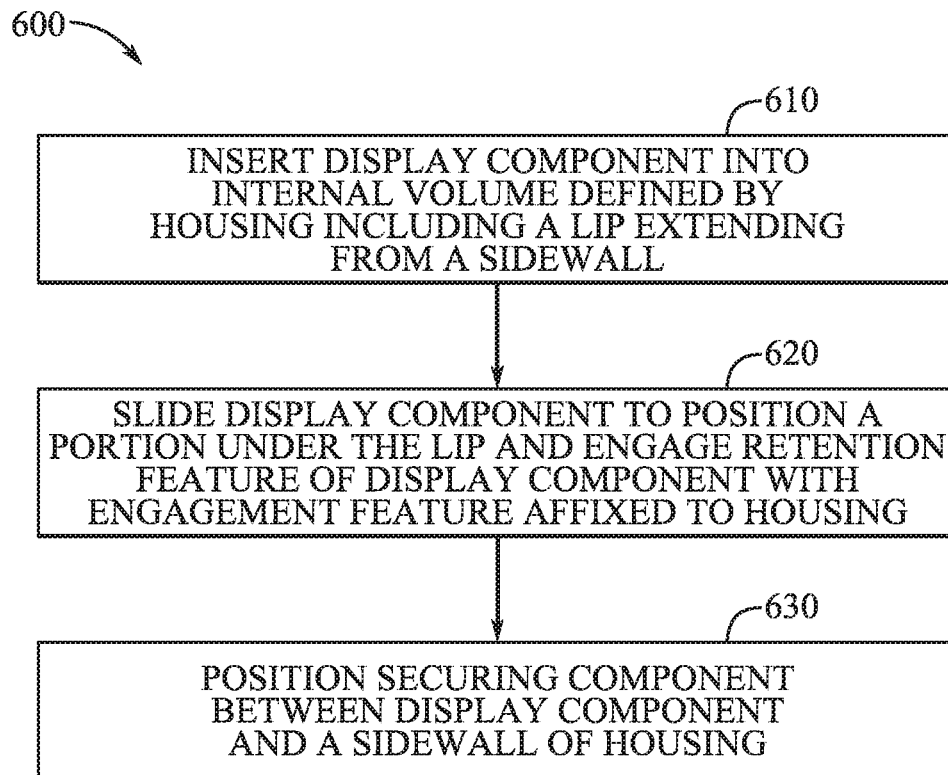
FIG. 13 shows a process flow diagram of a method for assembling an electronic device.

FIG. 13 shows a process flow diagram of an exemplary process for forming or assembling an electronic device, as described herein. The process 600 for assembling the device can include inserting a display component into an internal volume at least partially defined by a housing including a lip extending from a sidewall, at block 610, and sliding the display component in the internal volume to position a portion of the display component under the lip, at block 620, to engage a retention feature of the display component with an engagement feature affixed to the housing, and positioning a securing component in the internal volume between the display component and a sidewall of the housing, at block 630.

At block 610, a display component, such as a backlight unit as described herein, can be inserted into an internal volume at least partially defined by a housing that includes a lip extending from a sidewall, for example, housing 501 described above. As described with respect to FIGS. 10A-10C, the display component can be inserted, dropped, raised, translated, angularly rotated, or any combination thereof until it rests in the internal volume defined by the housing. In some examples, inserting the display component into the housing can also pass a portion of an engagement feature or features into one or more first orifices of the corresponding retention features of the display component, as described herein.

At block 620, the display component can be slid or translated in the internal volume relative to the housing to position at least a portion of the display component under the lip of the housing, for example, as illustrated in FIGS. 10B and 10C. This translation can also translate one or more retention features of the display component relative to one or more corresponding engagement features affixed to the housing to engage a retention feature of the display component with an engagement feature, for example, as illustrated in FIGS. 9B-9D and 10B-10C. In some examples, the sliding or translation of the display component relative to the housing can be achieved by inserting one or more tools between the display component and housing and exerting a force on the display component. In some examples, the tool or tools can be metal and can include steel. In some examples, a cam can be positioned in the internal volume and the cam can be rotated to exert a force on the display component and move the display component relative to the housing.

At block 630 a securing component or components can be positioned in the internal volume between the display component and the housing, for example, in a space or a location between the display component and the housing that is formed due to the lateral translation of block 620. In some examples, the securing component can include a shaft or a pin and a shim, for example, as described with respect to FIG. 10C.

Figure 14:
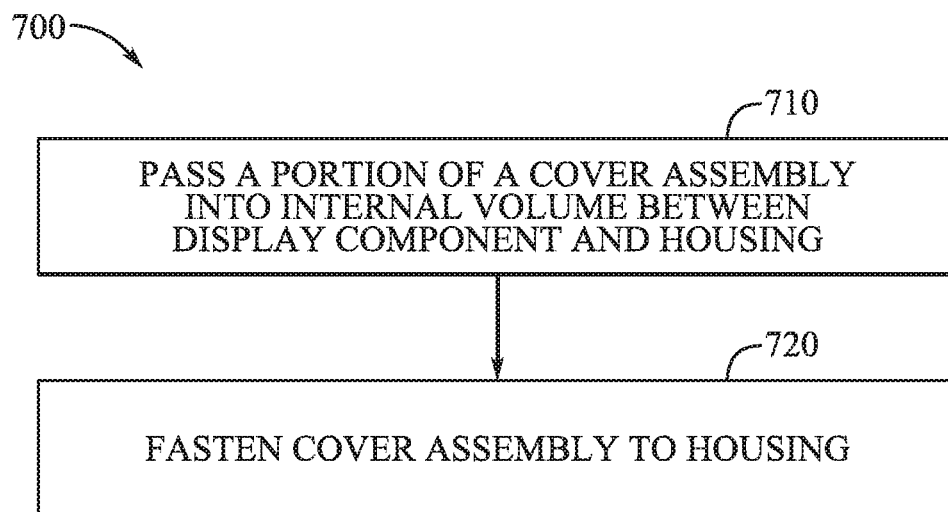
FIG. 14 shows a process flow diagram of a method for assembling an electronic device.

FIG. 14 shows a process flow diagram of an exemplary process for forming or assembling an electronic device, as described herein. The process 700 for assembling the device can include passing a portion of a cover assembly into an internal volume between a display component and the housing adjacent to a securing component, at block 710, and fastening the cover assembly to the housing, at block 720. In some examples, the process 700 can be carried out on a device that has been at least partially assembled by process 600, as described herein.

At block 710, a portion of a cover assembly, for example, a daughterboard, is passed into the internal space at least partially defined by the housing, between a sidewall of the housing and another component in the internal volume, such as a backlight unit, for example, as illustrated in FIG. 12B. The cover assembly can include a cover at least partially defining an exterior surface of the electronic device and the portion, such as the daughterboard, can extend substantially perpendicularly from the cover. In some examples, passing a portion of the cover assembly into the internal volume can include extending a flexible electrical connector from the portion in a first direction into a recess defined by the housing, and further extending the flexible connector from the recess in a second direction under the display component, for example, as illustrated in FIG. 12B.

At block 720, the cover assembly is fastened to the housing, for example, by applying or disposing a reworkable adhesive between the cover assembly and the housing, as described with respect to FIG. 12C. Upon fixing the cover assembly to the housing, the display component and the cover assembly, for example, including a transparent cover material and an LCD, are retained in or on the internal volume, and a major surface of the housing at least partially defining the exterior surface of the electronic device is free of components passing therethrough to fasten the display component or cover assembly to the housing.

While the present disclosure generally describes components and features and methods for their retention in an internal volume of a device, the components, features, and methods described herein can be used in any combination or order and with any component or electronic device as desired. Further, the components and features can assume any geometric shape, pattern, size, or combination of shapes, patterns, and sizes. Additionally, the engagement and retention features described herein can be positioned on or extend from any surface or surfaces of any desired housing and/or components.

To the extent applicable to the present technology, gathering and use of data available from various sources can be used to improve the delivery to users of invitational content or any other content that may be of interest to them. The present disclosure contemplates that in some instances, this gathered data may include personal information data that uniquely identifies or can be used to contact or locate a specific person. Such personal information data can include demographic data, location-based data, telephone numbers, email addresses, TWITTER® ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to deliver targeted content that is of greater interest to the user. Accordingly, use of such personal information data enables users to calculated control of the delivered content. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services or anytime thereafter. In another example, users can select not to provide mood-associated data for targeted content delivery services. In yet another example, users can select to limit the length of time mood-associated data is maintained or entirely prohibit the development of a baseline mood profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publicly available information.

As used herein, the terms exterior, outer, interior, inner, top, and bottom are used for reference purposes only. An exterior or outer portion of a component can form a portion of an exterior surface of the component but may not necessarily form the entire exterior of outer surface thereof. Similarly, the interior or inner portion of a component can form or define an interior or inner portion of the component but can also form or define a portion of an exterior or outer surface of the component. A top portion of a component can be located above a bottom portion in some orientations of the component, but can also be located in line with, below, or in other spatial relationships with the bottom portion depending on the orientation of the component.

Various inventions have been described herein with reference to certain specific embodiments and examples. However, they will be recognized by those skilled in the art that many variations are possible without departing from the scope and spirit of the inventions disclosed herein, in that those inventions set forth in the claims below are intended to cover all variations and modifications of the inventions disclosed without departing from the spirit of the inventions. The terms "including:" and "having" come as used in the specification and claims shall have the same meaning as the term "comprising."

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not target to be exhaustive or to limit the embodiments to the precise forms disclosed. It will be apparent to one of ordinary skill in the art that many modifications and variations are possible in view of the above teachings.

What is claimed is:

1. An electronic device, comprising:
   a housing at least partially defining an exterior surface and an internal volume of the electronic device;
   an engagement feature affixed to the housing, the engagement feature comprising a shaft having a first diameter and a top portion having a second diameter, the second diameter being larger than the first diameter;
   a display component disposed in the internal volume, the display component defining a retention feature including a first orifice having a diameter at least as large as the second diameter and a second orifice having a diameter less than the second diameter and at least as large as the first diameter, the first orifice intersecting the second orifice;
   the shaft disposed in the second orifice; and
   a securing component disposed between the display component and the housing.

2. The electronic device of claim 1, wherein the display component comprises a backlight unit.

3. The electronic device of claim 1, wherein:
   the housing defines a threaded receptacle;
   the engagement feature comprises a threaded portion disposed in the threaded receptacle; and
   the receptacle has a depth less than a thickness of the housing.

4. The electronic device of claim 1, wherein the first engagement feature and the second engagement feature extend into the internal volume from an internal surface of the housing.

5. The electronic device of claim 4, wherein the at least two engagement features extend into the internal volume from an internal surface of the housing.

6. The electronic device of claim 1, wherein the retention feature comprises a carrier plate.

7. The electronic device of claim 2, wherein the retention feature comprises a carrier plate affixed to the backlight unit.

8. The electronic device of claim 6, wherein the carrier plate comprises a metal.

9. The electronic device of claim 1, wherein:
   a portion of the housing defines a three-dimensional matrix of apertures extending from a first surface of the portion to a second surface of the portion; and
   the engagement feature being affixed to the housing at the portion.

10. An electronic device, comprising:
    a housing at least partially defining an exterior surface and an internal volume of the electronic device, an internal surface of the housing defining a recess;
    a backlight component disposed in the internal volume;
    a display assembly connected to the housing, the display assembly comprising:
       a cover at least partially defining an exterior surface of the electronic device;
       a display component extending generally perpendicularly from the cover and overlapping the recess; and
       a flexible electrical connector extending from the display component into the recess in a first direction and further extending from the recess in a second direction under the backlight component.

11. The electronic device of claim 10, wherein the display assembly comprises a liquid crystal display.

12. The electronic device of claim 10, wherein the display component comprises a daughterboard.

13. The electronic device of claim 10, wherein the first direction is perpendicular to the second direction.

14. The electronic device of claim 10, further comprising a protrusion extending from the housing at a position underlying the component and adjacent to the recess;
    wherein the second direction follows a path over the protrusion between the housing and the component.

15. The electronic device of claim 10, wherein the flexible electrical connector is disposed on the internal surface of the housing defining the recess.

16. The electronic device of claim 10, wherein the internal surface of the housing defining the recess comprises a rounded profile.

17. A method of assembling an electronic device, comprising:
    inserting a display component into an internal volume defined at least partially by a housing, the housing including a lip extending from a sidewall;
    sliding the display component in the internal volume to position a portion of the display component under the lip;
    engaging a retention feature of the display component with an engagement feature affixed to the housing; and
    positioning a securing component in the internal volume between the display component and the housing.

18. The method of claim 17, further comprising:
    passing a portion of a cover assembly into the internal volume between the display component and the housing adjacent to the securing component, the cover assembly including a cover at least partially defining an exterior surface of the electronic device; and
    fastening the cover assembly to the housing.

19. The method of claim 18, wherein passing a portion of the cover assembly into the internal volume comprises:
    extending a flexible electrical connector from the portion in a first direction into a recess defined by the housing; and
    extending the flexible connector from the recess in a second direction under the display component.

20. The method of claim 18, wherein:
    fastening the cover assembly to the housing comprises disposing a reworkable adhesive between the cover assembly and the housing;
    the display component and the cover assembly are retained on the housing; and
    a major surface of the housing at least partially defining the exterior surface of the electronic device is free of components passing through the major surface to fasten the display component or cover assembly to the housing.

* * * * *